United States Patent
Oohashi et al.

(10) Patent No.: US 6,552,463 B2
(45) Date of Patent: Apr. 22, 2003

(54) DYNAMO-ELECTRIC MACHINE HAVING WINDING PHASE GROUPS OF SERIES-CONNECTED WINDINGS CONNECTED IN PARALLEL

(75) Inventors: Atsushi Oohashi, Tokyo (JP); Yoshihito Asao, Tokyo (JP); Katsumi Adachi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/770,280

(22) Filed: Jan. 29, 2001

(65) Prior Publication Data

US 2002/0017825 A1 Feb. 14, 2002

(30) Foreign Application Priority Data

Aug. 10, 2000 (JP) .......................... 2000-243101

(51) Int. Cl.[7] .................. H02K 17/00; H02K 19/00; H02K 21/00; H02K 23/26; H02K 27/02; H02K 3/04

(52) U.S. Cl. ......................... 310/207; 310/184

(58) Field of Search ................. 310/179, 213, 310/210, 208, 203, 207, 202, 200, 198, 180, 189, 185, 184

(56) References Cited

U.S. PATENT DOCUMENTS

| | | | | |
|---|---|---|---|---|
| 2,575,716 A | * | 11/1951 | Kilgore | 318/224 |
| 3,308,363 A | * | 3/1967 | Rawcliffe et al. | 318/224 |
| 3,949,254 A | * | 4/1976 | Woll et al. | 310/198 |
| 4,484,125 A | * | 11/1984 | Hertz | 318/768 |
| 4,792,740 A | * | 12/1988 | Smith | 318/767 |
| 5,068,587 A | * | 11/1991 | Nakamura et al. | 318/771 |
| 5,274,322 A | * | 12/1993 | Hayashi et al. | 310/198 |
| 5,300,870 A | * | 4/1994 | Smith | 318/749 |
| 5,449,962 A | * | 9/1995 | Shichijyo et al. | 310/184 |
| 5,691,590 A | * | 11/1997 | Kawai et al. | 310/180 |
| 6,144,136 A | * | 11/2000 | Umeda et al. | 29/596 |
| 6,285,105 B1 | * | 9/2001 | Asao et al. | 310/179 |
| 6,288,471 B1 | * | 9/2001 | Kometani et al. | 310/193 |
| 6,313,559 B1 | * | 11/2001 | Kusase et al. | 29/596 |
| 6,326,715 B1 | * | 12/2001 | Asao et al. | 310/180 |
| 6,348,750 B1 | * | 2/2002 | Taji et al. | 310/179 |
| 6,388,357 B1 | * | 5/2002 | Tokumasu et al. | 310/198 |
| 6,417,592 B2 | * | 7/2002 | Nakamura et al. | 310/184 |
| 6,455,972 B1 | * | 9/2002 | Asao et al. | 310/184 |
| 6,469,413 B1 | * | 10/2002 | Oohashi et al. | 310/184 |
| 6,472,790 B2 | * | 10/2002 | Rose, Sr. | 310/184 |
| 6,492,757 B2 | * | 12/2002 | Nakamura et al. | 310/180 |

FOREIGN PATENT DOCUMENTS

| | | | | |
|---|---|---|---|---|
| JP | 06153472 A | * | 5/1994 | H02K/17/42 |
| JP | 2000-92766 | | 3/2000 | |

* cited by examiner

*Primary Examiner*—Nestor Ramirez
*Assistant Examiner*—Pedro J. Cuevas
(74) *Attorney, Agent, or Firm*—Sughrue Mion, PLLC

(57) ABSTRACT

A stator winding includes a plurality of first to sixth winding sub-portions each having one turn. First series-connected windings are formed with the first, third, and fifth winding sub-portions connected in series. Second series-connected windings are formed with the second, fourth, and sixth winding sub-portions connected in series. Each of Winding phase groups for each phase is formed with the first and second series-connected windings connected in parallel.

16 Claims, 15 Drawing Sheets

DYNAMO-ELECTRIC MACHINE HAVING WINDING PHASE GROUPS OF SERIES-CONNECTED WINDINGS CONNECTED IN PARALLEL

BACKGROUND OF THE INVENTION

1. Field of the Invention

The present invention relates to armature winding structures of dynamo-electric machines. In particular, the present invention relates to a stator winding structure of an alternator, for example, an automotive alternator to be mounted on an automotive vehicle, such as an automobile or a truck.

The entire content of the basic Japanese Patent Application from which the priority under the Convention is claimed in this application is hereby incorporated by reference into this application.

2. Description of the Related Art

In recent years, reduced sizes, increased outputs, and improved quality have been increasingly required of alternators. In order to obtain an increased output from an alternator reduced in size, it is important to distribute magnetic loading and electrical loading in a most appropriate manner and at a highest possible concentration within a limited volume.

The outputs of automotive alternators must be increased because of increasing vehicle loads while engine compartments become smaller, thereby reducing spaces for mounting the alternators. Also, there are requirements to reduce the noise of the automotive alternators which operate all the time for supplying electricity, the noise becoming relatively large with respect to the engine noise which has been reduced in response to the requirements to reduce the noise generated toward the outside and the inside of the vehicle compartments. The automotive alternators, which operate all the time, are required to have a very high heat resistance because of their severe operating thermal condition in which the alternators are heated by high Joule heat generated by the output current.

In order to reduce the size and increase the output of an alternator, the resistance of a stator winding must be reduced, the space factor of electrical conductors in magnetic circuits of the stator must be increased, and the bridge portions (bridge portions outside a stator core are called coil ends) of the stator winding must be set in order and be concentrated. Furthermore, the requirements for heat resistance, reduced noise, and the like must be complied with.

A structure for reducing the resistance of windings (heat loss), improving the space factor of electrical conductors, and lining up and concentration of coil ends was proposed disclosed in, for example, International Publication No. WO92/06527, in which short conductor segments having large cross-sections are used as electrical conductors of the stator winding.

In an alternator of this type, the reduction of turns of the stator winding for each phase is effective for reducing the armature raction which causes decrease in the output in a high-rotation range of, for example, 2000 to 5000 rpm. Particularly, the turns can be reduced by reducing the number of electrical conductors received in a slot, by which the flatness ratio (the size of the sections of the conductors in the slot-depth direction divided by the size of the same in the slot-width direction) of the electrical conductors increases. However, since short conductor segments formed in a U-shape by bending conductors having a rectangular section are used as the electrical conductors, it is difficult to form turn portions of the conductor segments as the flatness ratio of the electrical conductors increases. Therefore, it is necessary for reducing the turns for each phase of the stator winding to increase the number of the electrical conductors received in a slot so as to reduce the flatness ratio of the electrical conductors, thereby making the formation of the turn portions easy, and to connect in parallel the windings formed by connecting the electrical conductors.

A technology is disclosed in, for example, Japanese Unexamined Patent Application Publication No. 2000-92766, in which lap windings (loop windings) and wave windings each constructed by joining short conductor segments are connected in parallel to each other, thereby forming winding phase group for each phase of the stator winding.

As shown in FIG. 19, the known stator winding include three types of conductor segments 311, 312, and 313 made of a conductor having a rectangular section and formed substantially in a U-shape. Each of the conductor segments 311, 312, and 313 is inserted at the ends thereof in a pair of slots three slots apart (at a magnetic pole pitch) from an end of each slot in the axial direction, and the ends of the conductor segments 311, 312, and 313 extending from the other end of the same slots are connected to each other by welding or the like, thereby forming a coil of windings in four turns around the stator core. In each slot, six conductors are disposed alongside each other in a radial direction of the stator core, the six conductors being two sets of in-slot-received portions 311a, 312a, and 313a of the conductor segments 311, 312, and 313, respectively. The positions in each slot which are occupied by the six in-slot-received portions 311a, 312a, and 313a are hereinafter referred to as first address, second address, . . . , sixth address from the innermost toward outer positions in a radial direction of the stator core. A turn portion 313b of the conductor segment 313 is covered by a turn portion 312b of the conductor segment 312, and the turn portion 312b of the conductor segment 312 is covered by a turn portion 311b of the conductor segment 311, at an axial end face of the stator core.

At an axial end opposite to the axial end of the stator core at which the turn portions 311b, 312b, and 313b protrude, an end 313c of the conductor segment 313 extending from the third address of a slot is connected to an end 313c of the other conductor segment 313 extending from the fourth address of another slot three slots apart, thereby forming two winding sub-portions 301 and 303 each constructed with a wave winding, each in one turn per slot. An end 311c of the conductor segment 311 extending from the first address of a slot is connected to an end 312c of the conductor segment 312 extending from the second address of another slot three slots apart, and the end 312c of the conductor segment 312 extending from the fifth address of a slot is connected to the end 311c of the conductor segment 311 extending from the sixth address of another slot three slots apart, thereby forming two winding sub-portions 302 and 304 each constructed with a lap winding, each in two turns per slot.

As shown in FIG. 20, each of winding phase groups for three phases, each in six turns, is formed by connecting in series the two winding sub-portions 301 and 303, and the two winding sub-portions 302 and 304. In FIG. 21, each of winding phase groups for each turn, each in three turns, is formed by connecting in series the winding sub-portion 301 and the winding sub-portion 302, and the winding sub-portion 303 and the winding sub-portion 304, and connecting in parallel the series-connected winding sub-portions 301 and 302 and the series-connected winding sub-portions 303 and 304. Three sets of the winding phase groups thus formed are connected into an alternating connection, thereby forming a three-phase alternating winding constituting a stator winding, the stator winding being connected to a rectifier.

The known stator winding of an automotive alternator are formed in a manner such that three types of the conductor segments 311, 312, and 313 are inserted in a pair of slot separated by a distance of one magnetic-pole pitch from an end of the stator core so that the in-slot-received portions 311a, 312a, and 313a overlap each other, and the ends of the conductor segments 311, 312, and 313 extending from the other end of the stator core are connected to each other.

In the known stator winding formed as described above, the height of the coil ends of the stator winding at the end of the stator core 15 is increased, as shown in FIG. 22, whereby a problem has been found in that the alternator including the stator winding cannot be reduced in size, and due to an increased resistance of the stator winding, heat loss becomes large, the heat generation increases at the stator winding, and the leakage reactance at the coil ends increases, whereby the output cannot be increased.

Since the turn portion 313b is covered by the turn portion 312b and the turn portion 312b is covered by the turn portion 311b, the exposure area of the coil ends of the stator winding at the end of the stator core 15 is reduced, whereby the stator winding is not efficiently cooled. Therefore, the stator winding is heated up and the output cannot be increased.

One set of three-phase alternating winding is mounted on the stator core having one slot per phase per pole, and the output thereof is rectified by one rectifier. That is, a small number of the turn portions extending from the slots are disposed in the circumferential direction, whereby the cooling cannot be performed efficiently. Therefore, the stator winding are heated up and the output cannot be increased. The heat loss per one rectifying diode increases because only one rectifier is provided, the temperature rises, and an increased output is difficult to obtain.

SUMMARY OF THE INVENTION

Accordingly, it is an object of the present invention to provide a high-output dynamo-electric machine reduced in size and easy to manufacture, in which n-pairs of first wave windings and second wave windings are provided, the first wave windings being formed with a first winding wound in a wave-shape in one turn per slot and the second wave windings being formed with a second winding wound in a wave-shape in one turn per slot, the second winding being offset from the first winding by an electrical angle of 180 ° degrees so as to be opposite to the first winding, and two sets of series-connected windings in n-turns are connected in parallel, each set of the series-connected windings including the first and second windings for each phase, which respectively include n-wires, connected in series.

It is another object of the present invention to provide a high-output electrical rotating apparatus which includes two slots per pole per phase and a stator winding including two sets of alternating winding, each set being formed with the stator winding for each phase connected in an alternating connection so as to be rectified by one rectifier, whereby coil-end portions of the stator winding can be effectively cooled and the loss in rectifier diodes is reduced.

According to an aspect of the present invention, a dynamo-electric machine comprises:

an armature including an armature core provided with a plurality of slots extending in an axial direction of the armature core and disposed alongside each other in a circumferential direction of the armature core, and an armature winding mounted in the slots provided on the armature core, wherein the armature winding comprises first wave-shaped windings and second wave-shaped windings, the first wave-shaped windings comprising a number of first winding sub-portions each having one turn constructed by winding in a wave-shape a strand of wire so as to alternating occupy an inner layer and an outer layer in a slot-depth direction within the slots at intervals of a predetermined number of slots, the first winding sub-portions being disposed at a pitch of one slot from each other and being equal in number to the predetermined number of slots, and the second wave-shaped windings comprising a number of second winding sub-portions each having one turn constructed by winding in a wave-shape a strand of wire so as to alternating occupy an inner layer and an outer layer in a slot-depth direction within the slots at intervals of the predetermined number of slots and so as to be inversely wound and offset by an electrical angle of 180 degree relative to the first winding sub-portions, the second winding sub-portions being disposed at a pitch of one slot from each other and being equal in number to the predetermined number of slots, whereby n-pairs (n represents a natural number) of the first wave-shaped windings and the second wave-shaped windings are disposed so as to arrange alternately and in a row in-slot-received portions of the first winding sub-portions and in-slot-received portions of the second winding sub-portions in the slot-depth direction within each of the slots; and wherein the armature winding includes winding phase groups for each phase, each of the winding phase groups comprising 2n windings composed of the first and second winding sub-portions disposed in a group of slots at intervals of the predetermined number of the slots, two sets of the n windings being connected in series to form two series-connected windings each having n-turns, whereby the winding phase group is constructed by connecting the two series-connected windings in parallel.

The two series-connected windings may comprise first series-connected winding having n-turns formed by connecting in series the first winding sub-portions disposed in the group of slots and second series-connected winding having n-turns formed by connecting in series the second winding sub-portions disposed in the same group of slots as the group of the slots in which the first winding sub-portions are disposed.

An expression n=2m+1 (m represents a natural number) may be satisfied.

The strand of wire may be a substantially U-shaped conductor segment, and each of the first winding sub-portion and the second winding sub-portion may include a plurality of the conductor segments forming a wave winding in one turn connected to each other at the open ends thereof.

The strand of wire may be a continuous conductive wire, and each of the first winding sub-portion and the second winding sub-portion may include a single continuous conductive wire forming a wave winding in one turn.

Each pair of the first wave-shaped windings and the second wave-shaped windings may be formed with individual wire assemblies including a plurality of the first winding sub-portions and a plurality of the second winding sub-portions.

The strand of wire may be a conductor having a substantially circular cross-section.

The two series-connected windings for each phase forming the armature winding may be connected to each other via a metallic terminal.

The armature core may be a cylindrical stator core made of a laminated iron core, further the dynamo-electric machine may comprise a rotor forming N and S poles along the rotational periphery thereof, the rotor being disposed at an inside of and coaxially with the stator core, and a fan unit fixed to the rotor at the axial ends thereof for applying cooling air to coil-end groups of the armature winding by the rotation of the fan unit.

The n-pairs of the first wave-shaped windings and the second wave-shaped windings may include protrusions thereof from the axial ends of the stator core decreasing gradually toward the outside in the radial directions of the stator core.

According to another aspect of the present invention, a dynamo-electric machine comprises:

an armature including an armature core provided with a plurality of slots extending in an axial direction of the armature core and disposed alongside each other in a circumferential direction of the armature core, and armature winding mounted in the slots provided on the armature core, wherein two slots per pole per phase are formed in the armature core;

wherein the armature winding comprises two alternating windings, each formed by connecting winding phase groups for each phase into a alternating connection;

wherein each of the winding phase groups for each phases is formed by connecting in parallel two windings each having n-turns (n represents a natural number), the windings being constructed by winding a strand of wire in the armature core so as to dispose 2n in-slot-received portions of the strand of wire within each of the slots alongside each other in the slot-depth direction and so as to connect each in-slot-received portion in a first slots to other in-slot-received portions occupying addresses, in the slots individually separated from the first slot by a predetermined number of slots, differing in the slot-depth direction from that which is occupied by the in-slot-received portion in the first slot, at the outside of the slots; and wherein the individual alternating current outputs from the two alternating windings are rectified by first and second rectifiers, respectively, and outputted by being combined with each other.

N-rows of coil ends, each coil end being formed by connecting the in-slot-received portion in the first slots to the other in-slot-received portion occupying addresses, in the slots individually separated from the first slot by the predetermined number of slots, differing in the slot-depth direction from that which is occupied by the in-slot-received portion in the first slot, may be formed at at least one of the axial ends of the armature core, and the protrusion, in the axial direction, of the n-rows of the coil ends may be decreases gradually toward the outside in the radial direction of the armature core.

N-rows of coil ends, each coil end being formed by connecting the in-slot-received portion in the first slots to the other in-slot-received portion occupying addresses, in the slots individually separated from the first slot by the predetermined number of slots, differing in the slot-depth direction from that which is occupied by the in-slot-received portion in the first slot, may be formed at at least one of the axial ends of the armature core, and the coil ends in the n-rows may be arranged substantially evenly in the circumferential direction of the armature core.

Coil ends, each being formed by connecting the in-slot-received portion in the first slots to the other in-slot-received portion occupying addresses, in the slots individually separated from the first slot by the predetermined number of slots, differing in the slot-depth direction from that which is occupied by the in-slot-received portion in the first slot, may be stacked up in n-layers in the axial direction of the armature core at at least one of the axial ends of the armature core, and the coil ends in the n-layers may be arranged substantially evenly in the circumferential direction of the armature core.

Each strand of wire may be formed with substantially U-shaped conductor segments.

Each strand of wire may be formed with a continuous conductive wire.

An insulating resin may be disposed at at least one of the axial ends of the armature core and between the two windings each having n-turns forming the winding phase groups for each phase.

DESCRIPTION OF THE PREFERRED EMBODIMENTS

Embodiments according to the present invention are described below with reference to the drawings.

First Embodiment

Figure 1:
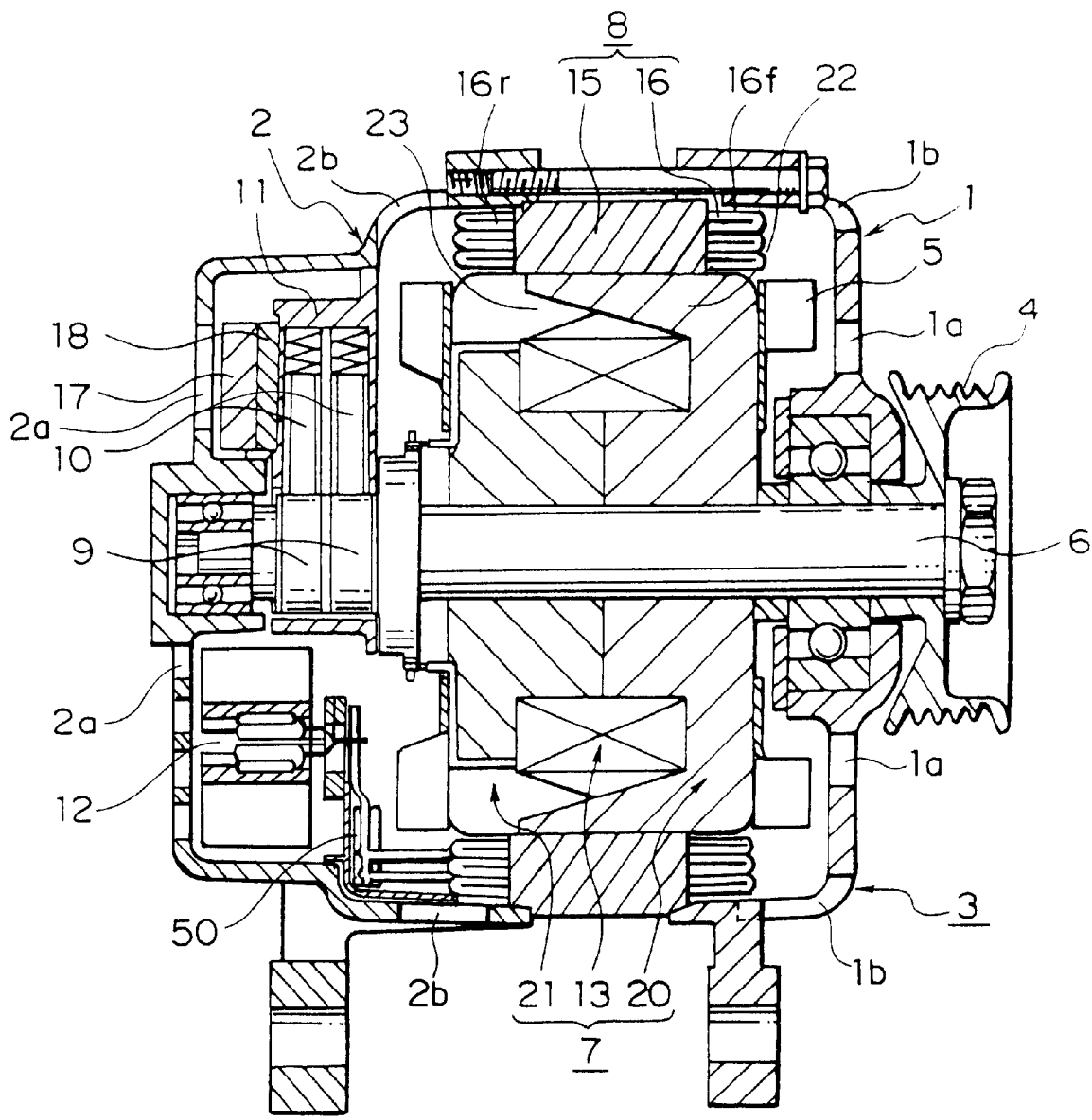
FIG. 1 is a sectional view of an automotive alternator according to a first embodiment of the present invention.
Figure 2:
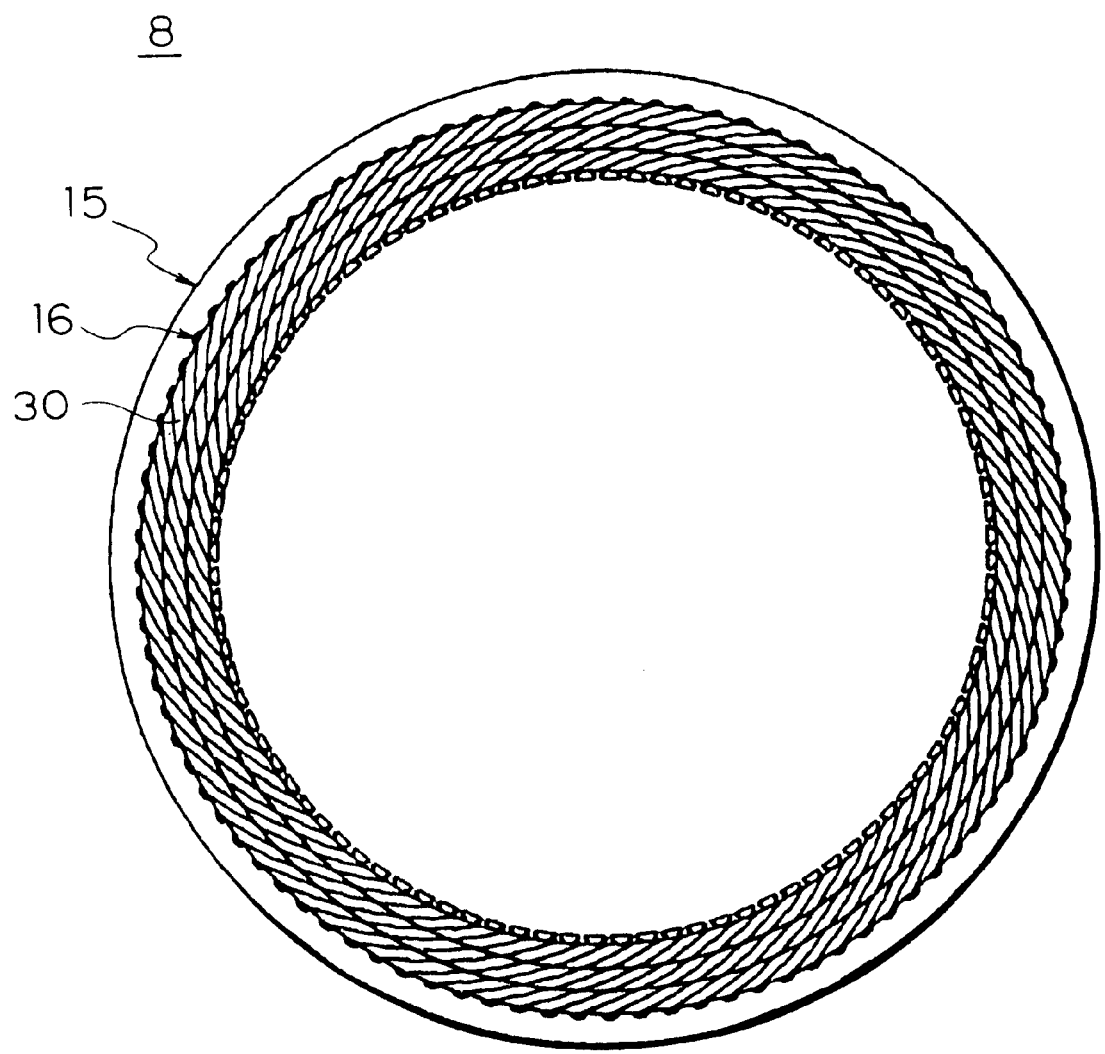
FIG. 2 is an end view of a stator of the automotive alternator according to the first embodiment of the present invention.
Figure 3:
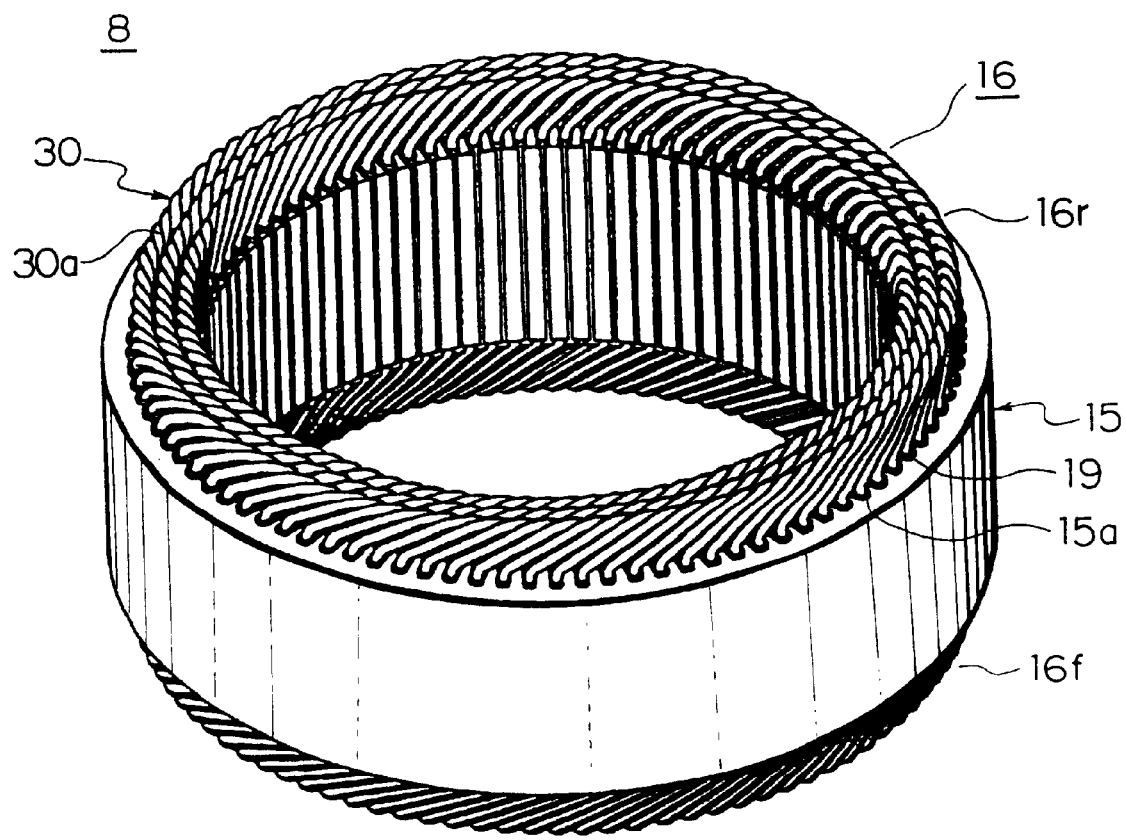
FIG. 3 is a perspective view of the stator of the automotive alternator according to the first embodiment of the present invention.
Figure 4:
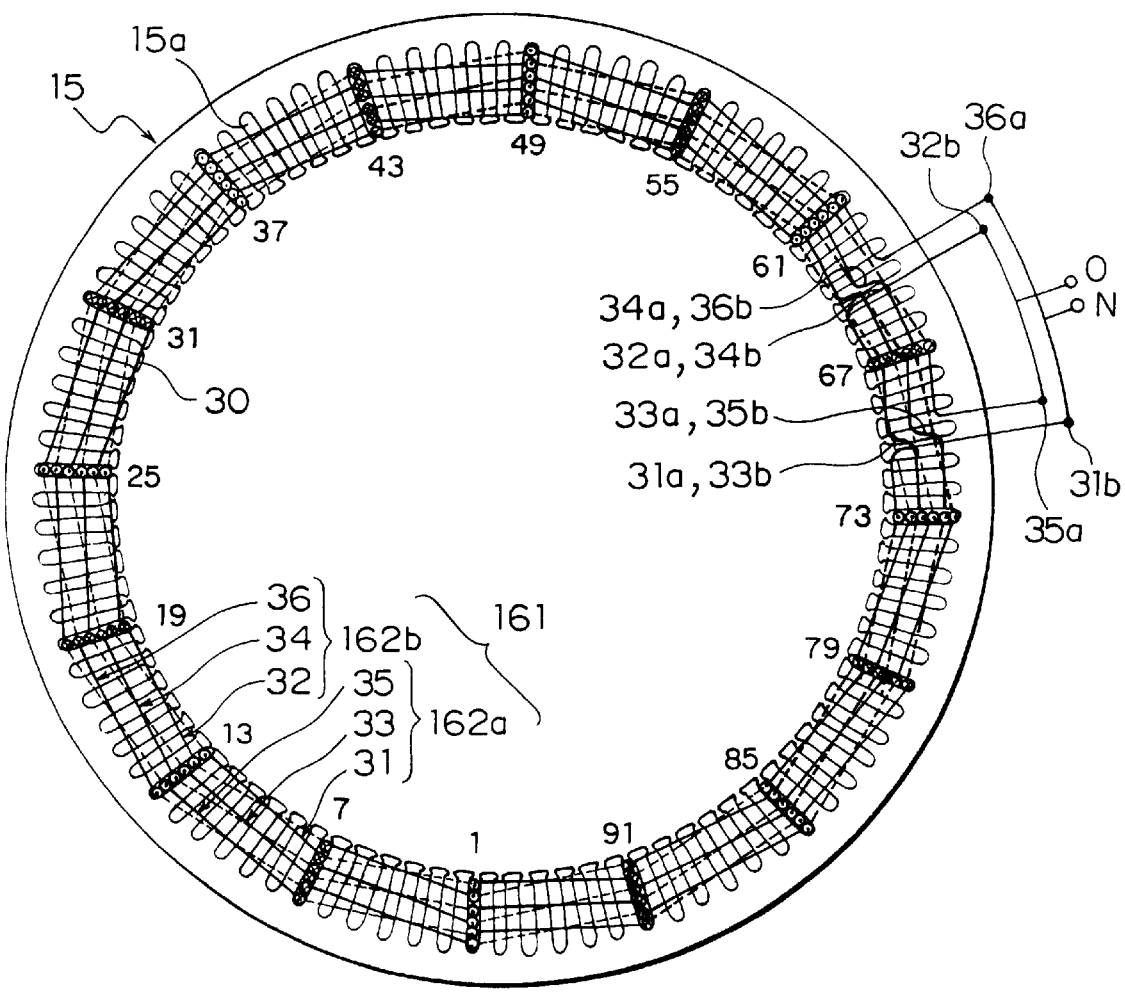
FIG. 4 is an end view from the rear side of a stator winding of the automotive alternator according to the first embodiment of the present invention, showing the connections for one phase.
Figure 5:
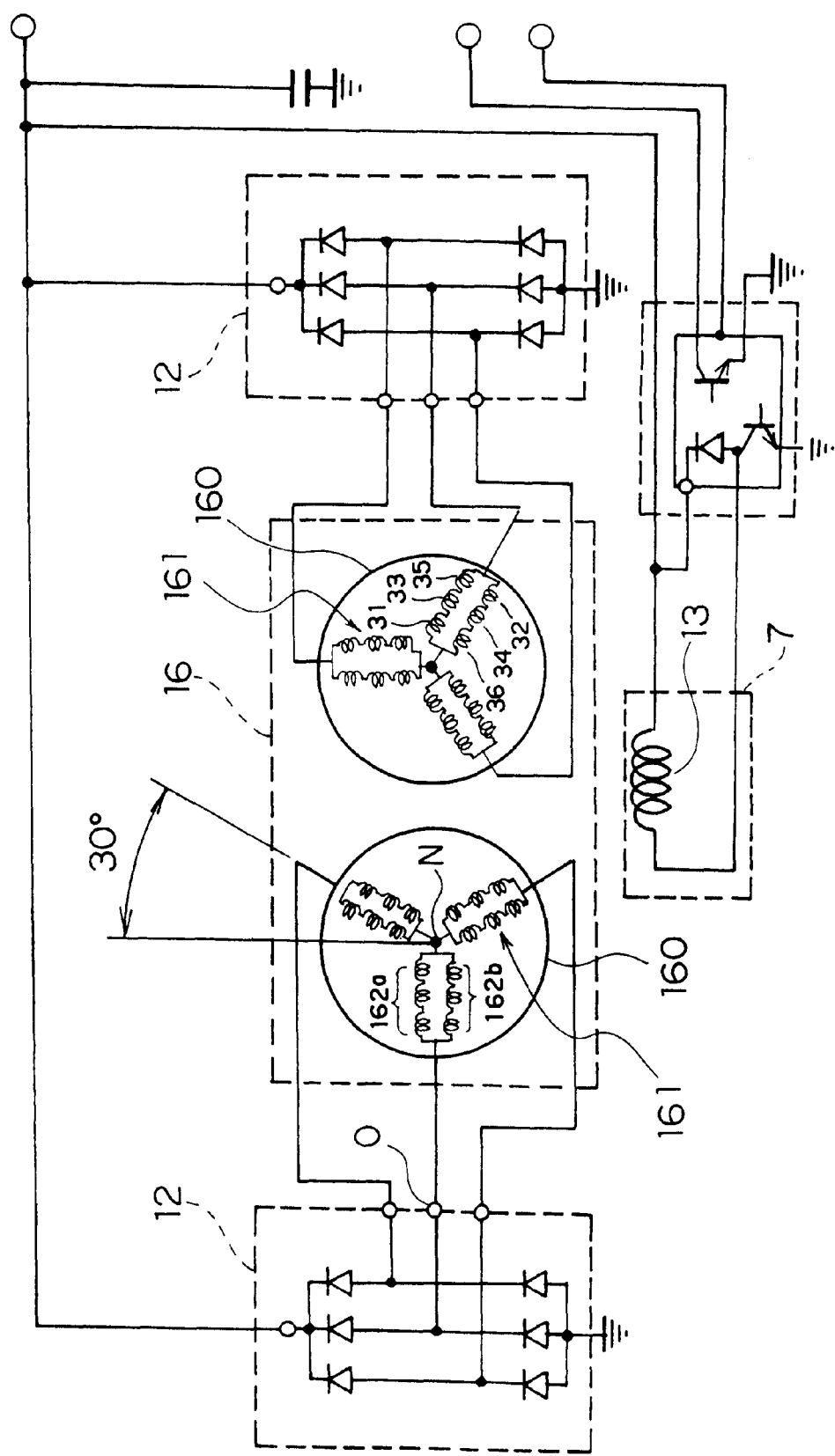
FIG. 5 is a block diagram of a circuit of the automotive alternator according to the first embodiment of the present invention.
Figure 6:
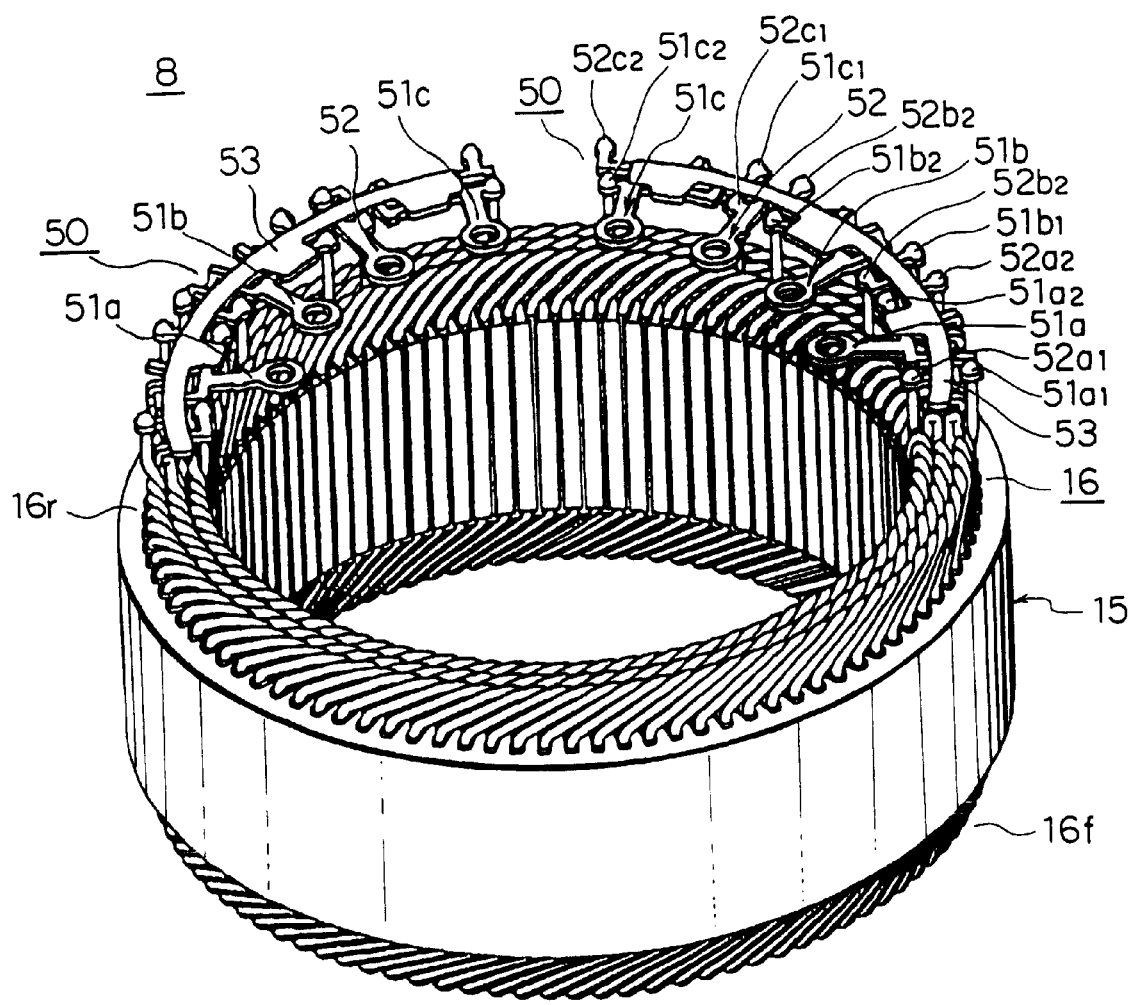
FIG. 6 is a perspective view of the stator of the automotive alternator according to the first embodiment of the present invention, on which metallic terminals are mounted.
Figure 7:
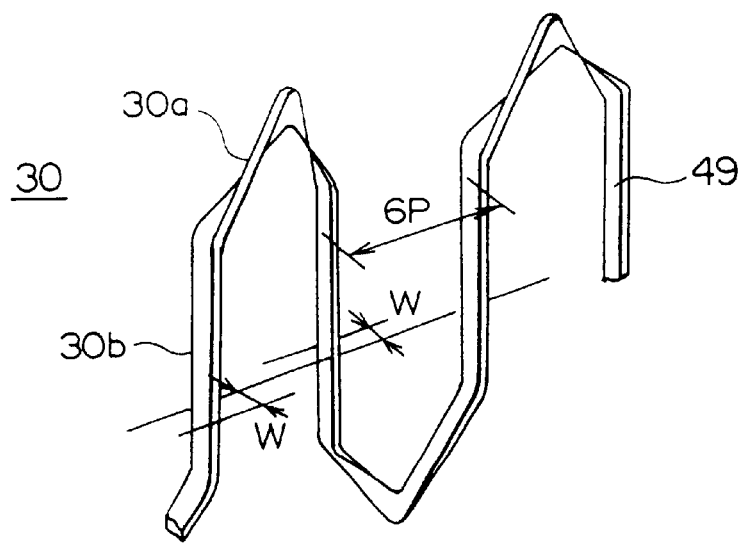
FIG. 7 is a perspective view of a critical portion of a strand of wire forming the stator winding used in the automotive alternator according to the first embodiment of the present invention.
Figure 8:
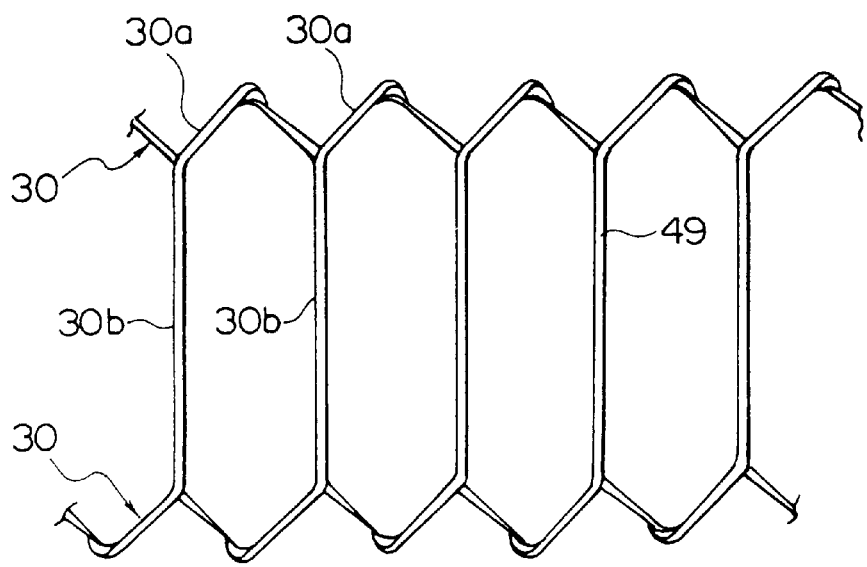
FIG. 8 is an illustration of the disposition of the strands of wire forming the stator winding used in the automotive alternator according to the first embodiment of the present invention.

FIG. 1 is a sectional view of an automotive alternator according to a first embodiment of the present invention. FIGS. 2 and 3 are an end view and a perspective view, respectively, of a stator of the automotive alternator according to the first embodiment of the present invention. FIG. 4 is an end view from the rear side of a stator winding of the automotive alternator according to the first embodiment of the present invention, showing the connections for one phase. FIG. 5 is a block diagram of a circuit of the automotive alternator according to the first embodiment of the present invention. FIG. 6 is a perspective view of the stator of the automotive alternator according to the first embodiment of the present invention, on which metallic terminals are mounted. FIG. 7 is a perspective view of a critical portion of a strand of wire forming the stator winding used in the automotive alternator according to the first embodiment of the present invention. FIG. 8 is an illustration of the disposition of the strands of wire forming the stator winding used in the automotive alternator according to the first embodiment of the present invention. FIGS. 9A and 9B are an end view and a plan view, respectively, of a winding assembly forming the stator winding used in the automotive alternator according to the first embodiment of the present invention. In FIGS. 2 and 3, lead wires and the like are omitted. In FIG. 4, wires at the rear side are shown by continuous lines and wires at the front side are shown by dotted lines.

The automotive alternator shown in FIG. 1 includes a Lundell-type rotor 7 rotatably supported by a shaft 6 in a case 3 formed with aluminum front bracket 1 and rear bracket 2. A stator 8 serving as an armature is fixed to the inner wall of the case 3 so as to cover the rotor 7 serving as a field at the periphery of the rotor 7.

The shaft 6 is rotatably supported by the front bracket 1 and the rear bracket 2. A pulley 4 is fixed to the shaft 6 at one end thereof, for transmitting the rotational torque of an engine to the shaft 6 via a belt (not shown).

Slip rings 9 for feeding current are fixed to the other end of the shaft 6. A pair of brushes 10 are received in a brush holder 11 disposed in the case 3. The pair of brushes 10 are held in contact with the slip rings 9 so as to slide thereon. A regulator 18 for regulating alternating voltage generated at the stator 8 is connected to a heat sink 17 coupled with the brush holder 11. Rectifiers 12 for rectifying alternating current generated at the stator 8 into direct current are mounted in the case 3, the rectifiers 12 being electrically connected to the stator 8.

The rotor 7 includes a rotor coil 13 for generating magnetic flux on passage of electric current, and a pair of pole cores 20 and 21 disposed so as to cover the rotor coil 13, magnetic poles being formed in the pole cores 20 and 21 by the magnetic flux generated in the rotor coil 13. The pair of iron pole cores 20 and 21 include eight claw-shaped magnetic poles 22 and eight claw-shaped magnetic poles 23 around the peripheries of the pole cores 20 and 21, respectively, protruding therefrom and disposed at the same angular distance from each other in the circumferential directions of the respective pole cores 20 and 21. The pair of pole cores 20 and 21 are fastened to the shaft 6 facing each other such that the claw-shaped magnetic poles 22 and 23 intermesh. A fan unit 5 is fixed to the rotor 7 at the axial ends thereof.

Intake openings 1a and 2a are formed in the front bracket 1 and the rear bracket 2, respectively, at each axial end face. Discharge openings 1b and two outlets 2b are formed in two outer circumferential shoulder portions of the front bracket 1 and the rear bracket 2, opposite the radial outside of the front-end and rear-end coil-end groups 16f and 16r of a stator winding 16, the coil-end groups 16f and 16r being disposed at the front side and the rear side, respectively, of the stator winding 16.

In FIGS. 2 and 3, the stator 8 includes a cylindrical stator core 15, made of laminated iron, provided with a plurality of slots 15a formed extending in the axial direction at a predetermined pitch in the circumferential direction, the stator winding 16 mounted on the stator core 15, and insulators 19 disposed in the slots 15a for electrically insulating the stator winding 16 from the stator core 15. The stator winding 16 includes a plurality of winding sub-portions in each which one strand of wire 30 is bent back outside the slots 15a at end surfaces of the stator core 15 and wound in a wave-shape so as to alternately occupy an inner layer and an outer layer in a slot-depth direction within slots 15a at intervals of a predetermined number of slots (the interval equals a magnetic pole pitch). The stator core 15 is provided with ninety-six slots 15a at the same distance from each other so as to receive two sets of a three-phase alternating winding corresponding to the number of the magnetic poles which is 16. That is, two slots per pole per phase make the total number of slots of 96. For example, a long copper wire having a rectangular cross-section and coated with an insulating film 49 is used as the strand of wire 30.

The winding configuration of a winding phase group 161 for each phase is described below with reference to FIG. 4.

The winding phase group 161 for each phase include first to sixth winding sub-portions 31 to 36, each winding sub-portion being formed with one strand of wire 30. The first winding sub-portion 31 is formed in a manner such that one strand of wire 30 is wound in a wave-shape into every sixth slots from slot number 1 to 91 so as to alternately occupy a first position from an inner circumferential side (hereinafter, referred to as a first address) and a second position from the inner circumferential side (hereinafter, referred to as a second address) inside the slots 15a, and the both ends of the strand of wire 30 are connected to each other, thereby forming the wave-shaped winding sub-portion in one turn. The second winding sub-portion 32 is formed in a manner such that one strand of wire 30 is wound in a wave-shape into every sixth slots from slot number 1 to 91 so as to alternately occupy the second address and the first address inside the slots 15a, and the both ends of the strand of wire 30 are connected to each other, thereby forming the wave-shaped winding sub-portion in one turn. The third winding sub-portion 33 is formed in a manner such that one strand of wire 30 is wound in a wave-shape into every sixth slots from slot number 1 to 91 so as to alternately occupy a third position from an inner circumferential side (hereinafter, referred to as a third address) and a fourth position from the inner circumferential side (hereinafter, referred to as a fourth address) inside the slots 15a, and the both ends of the strand of wire 30 are connected to each other, thereby forming the wave-shaped winding sub-portion in one turn. The fourth winding sub-portion 34 is formed in a manner such that one strand of wire 30 is wound in a wave-shape into every sixth slots from slot number 1 to 91 so as to alternately occupy the fourth address and the third address inside the slots 15a, and the both ends of the strand of wire 30 are connected to each other, thereby forming the wave-shaped winding sub-portion in one turn. The fifth winding sub-portion 35 is formed in a manner such that one strand of wire 30 is wound in a wave-shape into every sixth slots from slot number 1 to 91 so as to alternately occupy a fifth position from an inner circumferential side (hereinafter, referred to as a fifth address) and a sixth position from the inner circumferential side (hereinafter, referred to as a sixth address) inside the slots 15a, and the both ends of the strand of wire 30 are connected to each other, thereby forming the wave-shaped winding sub-portion in one turn. The sixth winding sub-portion 36 is formed in a manner such that one strand of wire 30 is wound in a wave-shape into every sixth slots from slot number 1 to 91 so as to alternately occupy the sixth address and the fifth address inside the slots 15a, and the both ends of the strand of wire 30 are connected to each other, thereby forming the wave-shaped winding sub-portion in one turn. The strands of wire 30 are arranged to line up a row of six strands within each slots 15a with the longitudinal direction of their rectangular cross sections aligned in a radial direction.

Portions of the strands of wire 30 of the second, fourth, and sixth winding sub-portions 32, 34, and 36 extending from slot numbers 61 and 67 at an end face of the stator core 15 are cut, and portions of the strands of wire 30 of the first, third, and fifth winding sub-portions 31, 33, and 35 extending from slot numbers 67 and 73 at the end face of the stator core 15 are cut. Then, a cut end 31a of the first winding sub-portion 31 and a cut end 33b of the third winding sub-portion 33 are connected. A cut end 33a of the third winding sub-portion 33 and a cut end 35b of the fifth winding sub-portion are connected. Thus, a first series-connected winding 162a in three turns are formed with the first, third, and fifth winding sub-portions 31, 33, and 35 connected to each other in series. In the same manner, a cut end 32a of the second winding sub-portion 32 and a cut end 34b of the fourth winding sub-portion 34 are connected. A cut end 34a of the fourth winding sub-portion 34 and a cut end 36b of the sixth winding sub-portion are connected. Thus, a second series-connected winding 162b in three turns are formed with the second, fourth, and sixth winding sub-portions 32, 34, and 36 connected to each other in series. Then, a cut end 31b of the first winding sub-portion 31 and a cut end 36a of the sixth winding sub-portion 36 are connected, and a cut end 32b of the second winding sub-portion 32 and a cut end 35a of the fifth winding sub-portion are connected. Thus, the first and second series-connected windings 162a and 162b, each in three turns, are connected in parallel, thereby forming the winding phase group 161 for one phase.

The connected portion of the cut ends 31b and 36a of the first and sixth winding sub-portions 31 and 36 serves as a neutral point N. The connected portion of the cut ends 32b and 35a of the second and fifth winding sub-portions 32 and 35 serves as a lead wire O.

In the same manner, other five sets of six winding sub-portions are disposed, each set in every sixth slot 15a being offset from the other by one slot. Thus, six sets of the winding phase group 161, each for one phase, are formed. In FIG. 5, three sets of winding phase group 161 connected in a star connection form one set of three-phase alternating winding 160. Two sets of the three-phase alternating winding 160 are individually connected to rectifiers 12. The direct-current outputs from the rectifiers 12 are combined by being connected in parallel.

Each strand of wire 30 constituting the first to sixth winding sub-portions 31 to 36 is wound in a wave-shape in a manner such that the strand of wire 30 extends from one of the slots 15a at an end face of the stator core 15, is folded back outside the slots 15a and is inserted in another slot 15a disposed away across five slots 15a therebetween. Each strand of wire 30 is wound so as to occupy alternately the inner layer and the outer layer with respect to the slot-depth direction (radial direction) in every sixth slot.

The strand of wire 30 extend outwards from each of the slots 15a at the end faces of the stator core 15 and is folded back to form turn portions 30a served as coil ends. The turn portions 30a which are formed into substantially the same shape at both ends of the stator 15 are mutually spaced circumferentially and radially, and arranged neatly in three rows circumferentially, to form coil-end groups 16f and 16r.

The winding structure of a stator winding 16 by using a metallic terminal is described below with reference to FIGS. 4 to 6.

A metallic terminal 50 includes a phase-a lead wire 51a, a phase-b lead wire 51b, a phase-c lead wire 51c, and a neutral-point lead wire 52 are formed integrally with each other via an insulative resin 53. The phase-a lead wire 51a includes connection tabs $51a_1$ and $51a_2$ formed integrally therewith. The phase-b lead wire 51b includes connection tabs $51b_1$, and $51b_2$ formed integrally therewith. The phase-c lead wire 51c includes connection tabs $51c_1$ and $51c_2$ formed integrally therewith. The neutral-point lead wire 52 includes connection tabs $52a_1$, $52a_2$, $52b_1$, $52b_2$, $52c_1$, and $52c_2$ formed integrally therewith.

The fifth and second winding sub-portions 35 and 32 constituting the winding phase group 161 for phase a are welded to the connection tabs $51a_1$ and $51a_2$, respectively, at the cut ends 35a and 32b, respectively. The first and sixth winding sub-portions 31 and 36 constituting the winding phase group 161 for phase a are welded to the connection tabs $52a_1$ and $52a_2$, respectively, at the cut ends 31b and 36a, respectively. The fifth and second winding sub-portions 35 and 32 constituting the winding phase group 161 for phase b are welded to the connection tabs $51b_1$ and $51b_2$, respectively, at the cut ends $35a$ and $32b$, respectively. The first and sixth winding sub-portions 31 and 36 constituting the winding phase group 161 for phase b are welded to the connection tabs $52b_1$ and $52b_2$, respectively, at the cut ends $31b$ and $36a$, respectively. The fifth and second winding sub-portions 35 and 32 constituting the winding phase group 161 for phase c are welded to the connection tabs $51c_1$ and $51c_2$, respectively, at the cut ends $35a$ and $32b$, respectively. The first and sixth winding sub-portions 31 and 36 constituting the winding phase group 161 for phase c are welded to the connection tabs $52c_1$ and $52c_2$, respectively, at the cut ends $31b$ and $36a$, respectively.

The winding phase groups 161 for each phase are formed by connecting in parallel the first series-connected windings 162a including the first, third, and fifth winding sub-portions 31, 33, and 35 connected in series and the second series-connected windings 162b including the second, fourth, and sixth winding sub-portions 32, 34, and 36 connected in series. Each neutral point of the winding phase groups 161 for each phase is connected to the neutral-point lead wire 52, and three sets of winding phase group 161 are connected into an alternating connection (into a star connection), thereby forming the three-phase alternating winding 160. The phase-a lead wire 51a, the phase-b lead wire 51b, the phase-c lead wire 51c, and the neutral-point lead wire 52 of each metallic terminal 50 are connected to the rectifier 12, whereby the configuration of a circuit shown in FIG. 5 is obtained.

Each of the first to sixth winding sub-portions 31 to 36 is constructed by winding the strand of wire 30 in a wave-shape so as to occupy alternately the inner layer and the outer layer in the slot-depth direction in every sixth slot 15a. The second, fourth, and sixth winding sub-portions 32, 34, and 36 are inversely wound and offset by an electrical angle of 180 degrees relative to the first, third, and fifth winding sub-portions 31, 33, and 35, respectively. The stator winding 16 thus formed has the same configuration as that in which three pairs of first wave-shaped winding groups constructed with the first winding sub-portions 31 and second wave-shaped winding groups constructed with the second winding sub-portions 32 are disposed so as to stack up in the radial direction of the stator core 15, each pair forming coaxial circles having different radius from each other around the stator core 15. Each pair of the first wave-shaped winding groups and the second wave-shaped winding groups are formed with a winding assembly constructed by knitting together twelve conductive wires 30 in a wave-shape.

Figure 9:
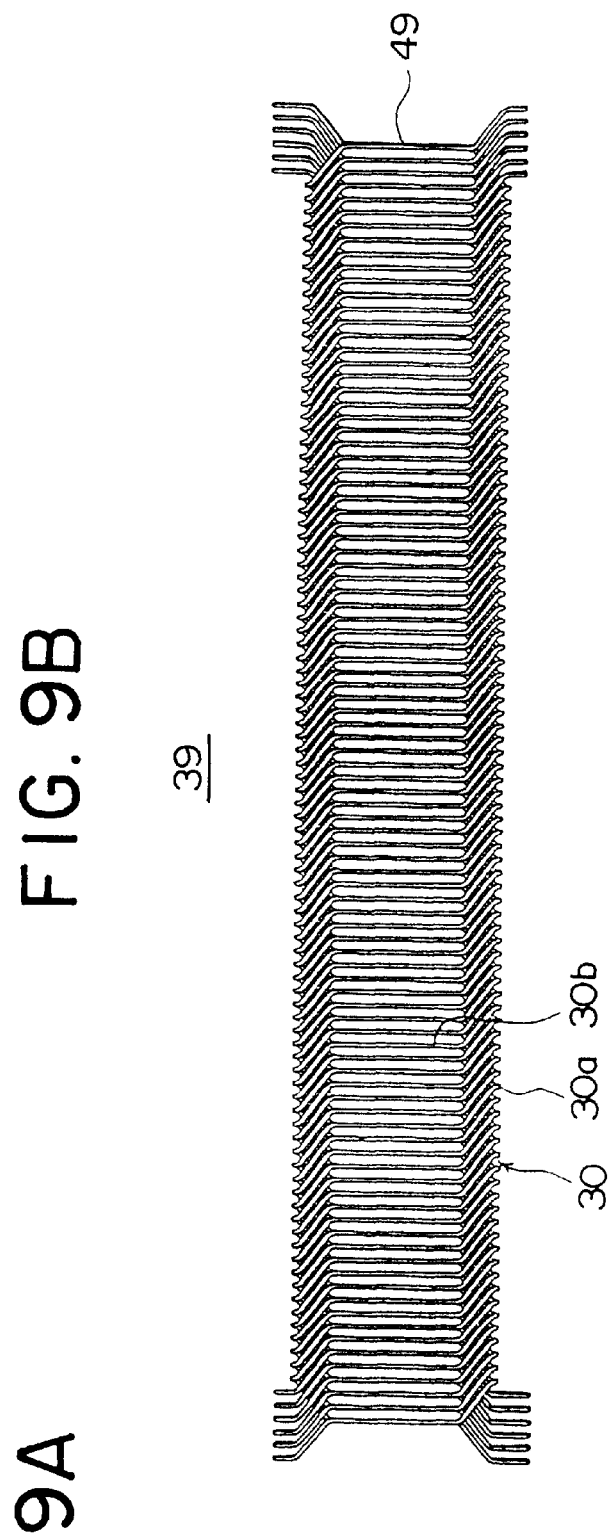
FIG. 9A is an end view of a winding assembly forming the stator winding used in the automotive alternator according to the first embodiment of the present invention.
FIG. 9B is a plan view of the winding assembly shown in FIG. 9A.

The configuration of the winding assembly is described below with reference to FIGS. 7 to 9.

FIG. 7 is a perspective view of a critical portion of a strand of wire forming the stator winding used in the automotive alternator. FIG. 8 is an illustration of the disposition of the strands of wire forming the stator winding used in the automotive alternator. FIG. 9A is an end view of the winding assembly forming the stator winding used in the automotive alternator, and FIG. 9B is a plan view of the same.

The strand of wire 30 is made of a continuous copper wire having a rectangular section and coated with an insulative film 49. The strand of wire 30, as shown in FIG. 7, is formed by bending it into a planar pattern in which straight portions $30b$ as in-slot-received portions connected by turn portions $30a$ are lined up at a pitch of six slots (6p). Adjacent straight portions $30b$ are offset alternately by a distance equal to one width (w) of the strands of wire 30 by means of the turn portions $30a$.

In FIG. 8, two strands of wire 30 formed in such a pattern are overlapped the straight portions $30b$ each other by being offset by a pitch of six slots, thereby forming a wire-strand pair. The wire-strand pair corresponds to a pair of the first and second winding sub-portions 31 and 32.

A winding assembly 39 shown in FIGS. 9A and 9B is constructed by arranging six wire-strand pair so as to be offset by a pitch of one slot from each other. Six ends of the strands of wire 30 extend at each side of each end of the winding assembly 39. The turn portions $30a$ are arranged so as to line up in rows on the sides of the winding assembly 39.

Three winding assemblies 39 thus arranged are mounted so as to stack up within slots 15a of a stator core 15, thereby forming a stator before wire-connection. The ends of the strands of wire 30 are connected on the basis of the connecting method shown in FIG. 4 to obtain the stator winding 16.

In the automotive alternator thus formed, when electrical current is supplied from a battery (not shown) to the rotor coil 13 via the brushes 10 and the slip rings 9, the magnetic flux is generated. By the magnetic flux, the claw-shaped magnetic poles 22 of the pole core 20 are magnetized with north-seeking (N) poles, and the claw-shaped magnetic poles 23 of the pole core 21 are magnetized with south-seeking (S) poles. When the rotational torque from the engine is transmitted to the shaft 6 via a belt and the pulley 4, thereby rotating the rotor 7, a rotational magnetic field is applied to the stator winding 16 and an electromotive force is generated in the stator winding 16. The alternating electromotive force passes through the rectifiers 12 and is thereby converted into direct current. The output voltage from the rectifiers 12 is regulated by the regulator 18, and the battery is charged.

At the rear side of the alternator, the fan unit 5 applies external air to a heat sink of the rectifiers 12 and the heat sink 17 of the regulator 18 through the intake openings $2a$ disposed opposing to the heat sink of the rectifiers 12 and the heat sink 17, respectively, whereby the air flows along the shaft 6 and cools the rectifiers 12 and the regulator 18. Thereafter, the air path is bent toward the outside in the radial directions by the fan unit 5, and the air cools the coil-end group $16r$ at the rear side of the stator winding 16 and is discharged through the discharge openings $2b$. At the front side of the alternator, the fan unit 5 draws the external air along the shaft 6 through the intake openings $1a$. Then, the air path is bent toward the outside in the radial directions by the fan unit 5, and the air cools the coil-end group $16f$ at the front side of the stator winding 16 and is discharged through the discharge openings $1b$.

According to the first embodiment, the stator winding 16 includes two three-phase alternating windings 160, each of the three-phase alternating windings 160 including three winding phase groups 161 connected into an alternating connection. Each set of the winding phase group 161 includes the first to sixth winding sub-portions 31 to 36. The strand of wire 30 forming the first winding sub-portion 31 is wound in one turn in a wave-shape so as to occupy alternately the first address and the second address in every sixth slot 15a. That is, the first winding sub-portion 31 includes the strand of wire 30 wound in one turn in a wave-shape so as to occupy alternately the inner layer and the outer layer in the slot-depth direction in one slot 15a at intervals of six slots. The second winding sub-portion 32 includes the strand of wire 30 wound in one turn in a wave-shape so as to occupy alternately the inner layer and the outer layer in the slot-depth direction in every sixth slot 15a, the second winding sub-portion 32 being inversely wound and offset by an electrical angle of 180 degrees relative to the first winding sub-portion 31. In the same fashion, the third winding sub-portion 33 includes the strand of wire 30 wound in one turn in a wave-shape so as to occupy alternately the third address and the fourth address in the slot-depth direction in every sixth slot 15a. The fourth winding sub-portion 34 includes the strand of wire 30 wound in one turn in a wave-shape so as to occupy alternately the fourth address and the third address in the slot-depth direction in every sixth slot 15a. The fifth winding sub-portion 35 includes the strand of wire 30 wound in one turn in a wave-shape so as to occupy alternately the fifth address and the sixth address in the slot-depth direction in every sixth slot 15a. The sixth winding sub-portion 36 includes the strand of wire 30 wound in one turn in a wave-shape so as to occupy alternately the sixth address and the fifth address in the slot-depth direction in every sixth slot 15a. Each of the winding phase groups 161 is formed by connecting in parallel the first series-connected winding 162a including the first, third, and fifth winding sub-portions 31, 33, and 35 connected in series and the second series-connected winding 162b including the second, fourth, and sixth winding sub-portions 32, 34, and 36 connected in series.

Since the stator winding 16 is formed only with wave windings, the height of the coil ends can be reduced and the exposure area of the coil ends can be increased compared with a known technology in which the combination of lap windings and wave windings is used.

Moreover, the size of a stator (an alternator) can be reduced because the height of coil ends is reduced. An increased output can be obtained because the resistance of windings, the heat loss, the heat generation in the stator winding 16, and the leakage reactance in the coil ends are reduced. The stator winding 16 can be cooled efficiently due to the enlarged exposure area of the coil ends, whereby the temperature rise in the stator winding 16 can be suppressed, thereby providing a high output of an alternator.

The winding phase group 161 in three turns can be formed with six winding sub-portions, each being wound in a wave-shape in one turn. That is, the winding phase group 161 in an odd number of turns can be formed by using 2m+1 pairs (m represents a natural number) of winding sub-portions wound in a wave-shape. In a known alternator, when the winding phase group are formed with a plurality of pairs of winding sub-portions, the winding phase group 161 for each phase in an odd number of turns cannot be formed because the winding phase group is constructed by connecting the winding sub-portions in series. According to the embodiment of the present invention, the winding phase group 161 for each phase in an odd number of turns can be realized by connecting each halved winding sub-portions in series to form two series-connected windings and connecting the two series-connected windings in parallel. The flatness ratio of the strand of wire can be reduced even when the number of turns is reduced, the strand of wire can be formed easily.

For example, in a stator including the stator winding 16 constructed with the winding phase groups 161 each having four turns, when a sufficient output cannot be obtained due to the armature reaction in a high rotation range, reduction of turns of the winding phase group 161 may be a countermeasure. In this case, a problem may occur in that a sufficient output cannot be obtained in a low rotation range due to an excessively reduced turns in which the winding phase groups are provided in units of two when the winding phase group in an odd number of turns is not available.

Therefore, an advantage of the winding phase group in an odd number of turns is that a problem of insufficient output in a high rotation range due to the armature reaction can be solved while maintaining the output in a low rotation range on a permissible level by reducing by one turn for each phase of the stator winding, and the output in a high rotation range can be increased.

Since each of the first series-connected windings 162a is composed of the first, third, and fifth winding sub-portions 31, 33, and 35, and each of the second series-connected windings 162b is composed of the second, fourth, and sixth winding sub-portions 32, 34, and 36, the first and second series-connected windings 162a and 162b are constructed with an inner layer winding, an intermediate layer winding and an outer layer winding in the radial direction of the stator, respectively. Consequently, the first and second series-connected windings 162a and 162b are evenly cooled by cooling air passing through the coil-end groups, thereby suppressing temperature rise in the stator winding.

Since the strand of wire 30 is a continuous wire, the number of welding points is significantly reduced, compared with a known technology in which a plurality of conductor segments are used as a strand of wire. Therefore, laborious welding operations can be alleviated, and the efficiency in the operations can be improved, whereby welding quality and yield ratio are improved.

When ends of the conductor segments are connected to each other in a known technology, a jig is used for holding the ends of the segments during welding, whereby the height of the coil end increases at the side at which the welding is performed. According to the first embodiment, the coil ends are formed with the turn portions 30a of the strands of wire 30 which are continuous, whereby welding is not necessary for forming the coil ends, thereby reducing the height of the coil-end groups.

The pairs of the wave windings form the winding assembly 39, whereby the winding operation of the stator winding is simplified, thereby improving efficiency in the manufacture of the stator. The turns can be increased simply by mounting a plurality of the winding assemblies 39 overlapping each other on the stator core. When U-shaped conductor segments are mounted, the conductor segments move by the length of each slot or more in the corresponding slots because the conductor segments must be inserted in the slots from an end of a stator core in the longitudinal direction of the conductor segments. On the other hand, the winding assembly 39 is inserted into the slots from, for example, the inner periphery of the stator core in a direction perpendicular to the strands of wire, whereby the winding assembly 39 does not move more than the depth of each slot in the corresponding slots. Therefore, there is a reduced risk of damages to the insulative films due to the friction between the strands of wire and the inner walls of the slots, thereby ensuring superior insulation.

Since the metallic terminal 50 is used for connection in the winding phase group 161 for each phase, the connection operation of the windings is simplified. The stator winding can be formed so as to have winding phase groups each having three turns or those each having six turns by using one type of winding configuration and by modifying the metallic terminal 50. The modification of the metallic terminal 50 is such that the connection tabs $51a_1$ and $51a_2$ are separated from the phase-a lead wire 51a and are formed integrally with each other, and the connection tab $52a_2$ is separated from the neutral-point lead wire 52 and is formed integrally with the phase-a lead wire 51a. The connection tabs $51b_1$ and $51b_2$ are separated from the phase-b lead wire 51*b* and are formed integrally with each other, and the connection tab 52$b_2$ is separated from the neutral-point lead wire 52 and is formed integrally with the phase-b lead wire 51*b*. The connection tabs 51$c_1$ and 51$c_2$ are separated from the phase-c lead wire 51*c* and are formed integrally with each other, and the connection tab 52$c_2$ is separated from the neutral-point lead wire 52 and is formed integrally with the phase-c lead wire 51*c*, Consequently, the first to sixth winding sub-portions 31 to 36 are connected in series to form winding phase groups each having six turns.

In the stator winding 16, the turn portions 30*a* of the strands of wire 30 are mutually spaced circumferentially and radially, and arranged neatly in three rows circumferentially, to form coil-end groups 16*f* and 16*r*, whereby the protrusions of the coil-end groups 16*f* and 16*r* from the ends of the stator core 15 are reduced. Therefore, wind noise due to the rotation of the rotor 7 is reduced, and the leakage reactance at the coil ends decreases, thereby improving the output and the efficiency.

In the stator winding 16, the turn portions 30*a* of the strands of wire 30 are mutually spaced circumferentially and radially, and arranged neatly in three rows circumferentially, to form coil-end groups 16*f* and 16*r*. Therefore, the wind resistance against the cooling air is even in the circumferential direction, whereby the coil-end groups 16*f* and 16*r* are cooled evenly in the circumferential direction, thereby suppressing temperature rise in the stator winding 16.

Cooling air is applied to the coil-end groups 16*f* and 16*r* by the fan unit 5 fixed to the axial ends of the rotor 7, thereby efficiently suppressing temperature rise in the stator winding 16.

Each of the first and second series-connected windings 162*a* and 162*b* is composed of three winding sub-portions which occupy the inner, intermediate, and outer layers, respectively. Therefore, the variations in resistance and inductance among the three winding assemblies 39 produced in the manufacture are distributed evenly between the first and second series-connected windings 162*a* and 162*b*, whereby the differences in the resistance and the inductance between the first and second series-connected windings 162*a* and 162*b* are reduced. Accordingly, for example, the flow of a part of the electrical current through the first series-connected windings 162*a* into the second series-connected windings 162*b* can be suppressed, whereby reduction of the output due to circulating currents flowing from the first series-connected windings 162*a* to the second series-connected windings 162*b* can be suppressed.

The stator winding 16 includes two sets of the three-phase alternating winding 160, each including the winding phase groups 161 for three phases connected into a star connection. The turn portions 30*a* extending from ninety-six slots (2 slots per pole per phase) are arranged neatly in rows in the circumferential direction. The two sets of the three-phase alternating winding 160 are connected to the individual rectifiers 12. The direct outputs of the rectifiers 12 are connected in parallel and are combined with each other. Each of the coil-end groups 16*f* and 16*r* is formed with three sets of the ninety-six turn portions 30*a*, each set arranged neatly in a row in the circumferential direction and forming a circle having a radius differing from the others. Each of the coil-end groups 16*f* and 16*r* including the 288 turn portions 30*a* is cooled efficiently, thereby suppressing temperature rise in the stator winding and providing an increased output. Since electrical current having phases differing by 30 degrees from each other is generated, the temperature in the coil-end groups is distributed more evenly than in a case of a known alternator, whereby temperature rise in the stator winding is suppressed, and an increased output is provided. Since two sets of rectifiers are used, the loss per one rectifying diode is reduced by half with respect to a known technology, whereby the temperature in the rectifying diodes is reduced, and a higher output is provided.

By providing two sets of windings having a phase difference of 30 degrees from each other, harmonic magnetomotive force components, which cause magnetic noise of an alternator, can be cancelled. The strength of the coil-end groups is increased by disposing the turn portions 30*a* in three rows alongside in the radial direction, thereby further reducing the magnetic noise.

Second Embodiment

According to a second embodiment of the present invention, substantially U-shaped conductor segments are used instead of the continuous wire used in the first embodiment described above.

Figure 10:
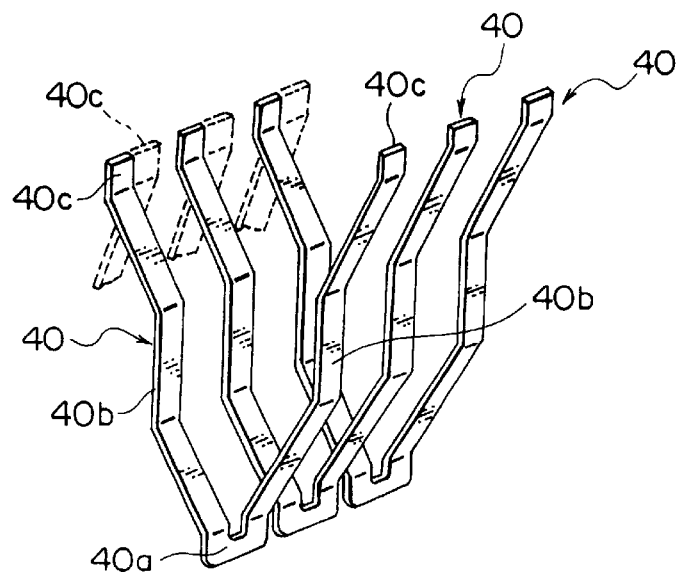
FIG. 10 is a perspective view showing the disposition of strands of wire forming a stator winding used in an automotive alternator according to a second embodiment of the present invention.
Figure 11:
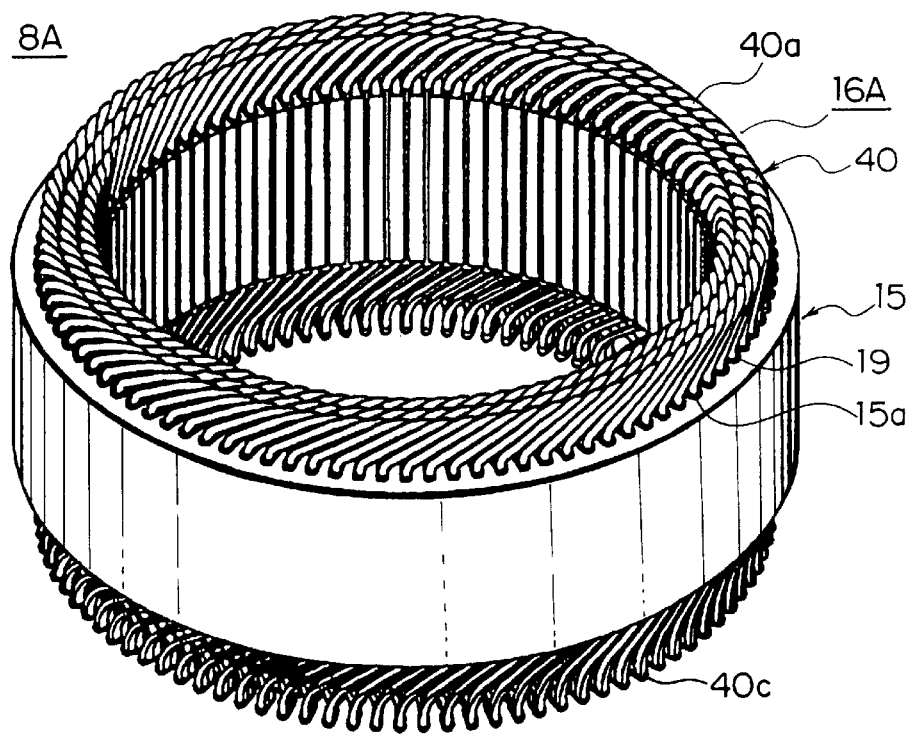
FIG. 11 is a perspective view of a stator of the automotive alternator according to the second embodiment of the present invention.

FIG. 10 is a perspective view showing the disposition of strands of wire 40 forming a stator winding used in an automotive alternator according to the second embodiment. FIG. 11 is a perspective view of a stator of the automotive alternator according to the second embodiment. In FIG. 11, lead wires and the like are omitted.

A short copper wire having a rectangular section coated with an insulative film 49 is used as a strand of wire 40, which includes a pair of straight portions 40*b* as in-slot-received portions connected by a V-shaped turn portion 40*a* so as to be formed substantially in a U-shape.

Three strands of wires 40 are inserted in two slots 15*a* six slots apart (at a magnetic pole pitch) at the two ends of each strand of wire 40, respectively, from an axial end of a stator core 15. The strands of wire 40 are bent at the ends thereof protruding from the other axial end of the stator core 15 so that the ends of each strand of wire 40 separate from each other. In this case, one of the three strands of wire 40 is inserted at one end thereof in the first address of one of the two slots 15*a* (a first slot 15*a*) and at the other end of the strand of wire 40 in the second address of the other one of the two slots 15*a* (a second slot 15*a*). Another strand of wire 40 is inserted at one end thereof in the third address of the first slot 15*a* and at the other end of the strand of wire 40 in the fourth address of the second slot 15*a*. The remaining strand of wire 40 is inserted at one end thereof in the fifth address of the first slot 15*a* and at the other end of the strand of wire 40 in the sixth address of the second slot 15*a*. In the same manner, other sets of the three strands of wire 40 are inserted in every slot 15*a* at the magnetic pole pitch so that six straight portions 40*b* of the strands of wire 40 are disposed alongside each other in the radial direction in each slot 15*a*.

The strands of wire 40 are connected to each other at an end 40*c* of each strand of wire 40 protruding from the first address of the slot 15*a* with the end 40*c* of each of the other strand of wires 40 protruding from the second address of the slot 15*a* separated from the former slot 15*a* with five slots therebetween, whereby two wave windings, each in one turn, are obtained. These two wave windings correspond to the first and second winding sub-portions 31 and 32.

The strands of wire 40 are connected to each other at the end 40*c* of each strand of wire 40 protruding from the third address of the slot 15*a* with the end 40*c* of each of the other strands of wire 40 protruding from the fourth address of the slot 15*a* separated from the former slot 15*a* with five slots therebetween, whereby two wave windings, each in one turn, are obtained. These two wave windings correspond to the third and fourth winding sub-portions 33 and 34.

The strands of wire 40 are connected to each other at the end 40*c* of each strand of wire 40 protruding from the fifth address of the slot 15a with the end 40c of each of the other strands of wire 40 protruding from the sixth address of the slot 15a separated from the former slot 15a with five slots therebetween, whereby two wave windings, each in one turn, are obtained. These two wave windings correspond to the fifth and sixth winding sub-portions 35 and 36.

With this arrangement, a stator 8a shown in FIG. 11 is obtained, which is formed with a stator winding 16A including the wave windings, each in one turn, mounted on the stator core 15.

Three of the six wave windings thus formed, each in one turn, are connected in series, and the remaining three wave windings are also connected in series on the basis of the connection method shown in FIG. 4. Then, two sets of the wave windings connected in series are connected to each other in parallel, thereby forming a winding phase group in three turns.

Thus according to the second embodiment, the same effect as in the first embodiment can be obtained.

Since one type of substantially U-shaped conductor segments is used as the strand of wire 40, according to the second embodiment, for forming the wave windings, the productivity is improved with respect to the known technology in which three types of conductor segments are used.

A coil-end group is formed with the turn portions 40a lined up in a row in the radial direction of the stator core 15, whereby the protrusion of the coil-end group can be reduced, and the exposure area increases, compared with the known technology in which the turn portions 311a, 312a, and 313a forming the coil-end group stack up in three layers in the axial direction of the stator core. Therefore, the size of an alternator can be reduced, and an increased output can be obtained of the alternator.

Third Embodiment

Figure 12:
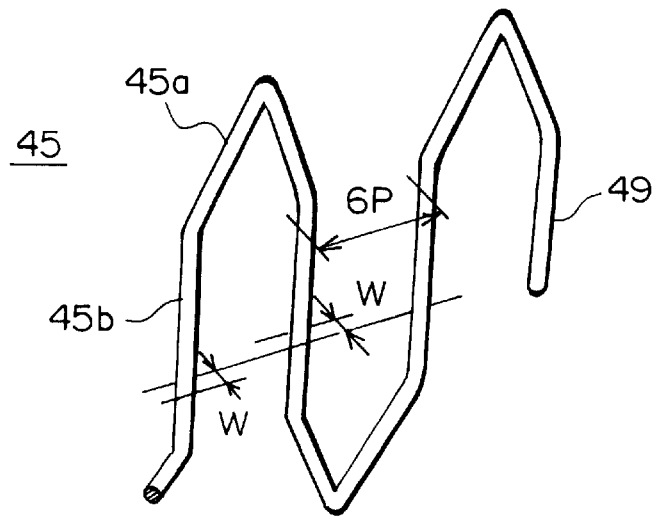
FIG. 12 is a perspective view of a critical portion of a strand of wire forming a stator winding of an automotive alternator according to a third embodiment of the present invention.

According to a third embodiment, a continuous copper wire having a circular cross-section coated with an insulating film 49 is used as a strand of wire 45. The strand of wire 45, as shown in FIG. 12, is formed by bending it into a planar pattern in which straight portions 45b served as in-slot-received portions connected by turn portions 45a are lined up at a pitch of six slots (6p). Adjacent straight portions 45b are offset alternately by a distance equal to one width (w) of the strands of wire 45 by means of the turn portions 45a. The other configuration of the wire 45 is the same as that of the wire 30 described in the first embodiment.

Since the strand of wire 45 has a circular cross-section, according to the third embodiment, bending operations can be performed more easily than that of the strand of wire 30 which has a rectangular cross-section. The turn portions 45a (coil-end portion) can be easily formed, whereby a winding assembly 39 can be easily manufactured. When cut ends of first to sixth winding sub-portions 31 to 36 are welded to connection tabs of a metallic terminal 50, the operation of bending the cut ends of the first to sixth winding sub-portions 31 to 36 and positioning them on the connection tabs is easily performed, whereby the welding can be easily performed.

When the strand of wire 30 having a rectangular cross-section is used, there is a risk of damaging the insulating film 49 due to the edge of the strand of wire 30 during the forming of the winding assembly 39 and the mounting thereof on the stator core 15. However, according to the third embodiment, since the strand of wire 45 has a circular cross-section, the damage to the insulating film 49 due to the interference between the strands of wire can be suppressed, thereby improving insulation reliability.

Although according to the third embodiment, the strand of wire 30 used in the first embodiment is replaced by a continuous copper wire having a circular cross-section, the strand of wire 40 according to the second embodiment may be replaced by conductor segments having a circular cross-section.

Fourth Embodiment

Figure 13:
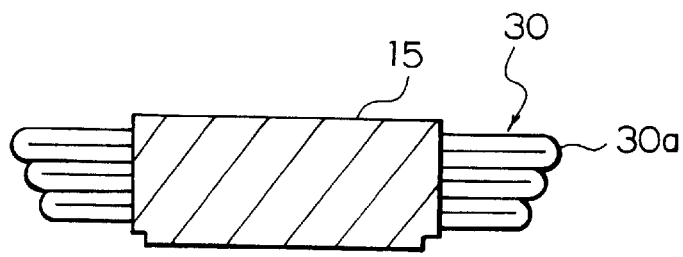
FIG. 13 is a sectional view of a critical portion of a stator used in an automotive alternator according to a fourth embodiment of the present invention.

According to a fourth embodiment, a winding assembly 39 includes turn portions 30a disposed in three rows around the periphery of the stator core, of which the protrusion in the axial direction is reduced gradually toward the outside in the radial directions of the stator core, as shown in FIG. 13. The other configuration is the same as that which is described in the first embodiment.

According to the first embodiment, the turn portions 30a included in the winding assembly 39 are disposed in three rows around the periphery of the stator core, the protrusion of each row in the axial direction is the same as that of the other rows. Therefore, the resistances of the first to sixth winding sub-portions 31 to 36 are substantially the same as each other, whereby the generated heat is substantially the same between each winding sub-portion. The first to sixth winding sub-portions 31 to 36 are more likely to be cooled by cooling air at the inner part. Therefore, the temperature is more likely to increase at the outer side of stator winding 16, whereby the stator winding 16 cannot be cooled efficiently.

According to the fourth embodiment, the winding assembly 39 includes the turn portions 30a disposed in three rows around the periphery of the stator core, of which the protrusion in the axial direction is reduced gradually toward the outside in the radial directions of the stator core. Therefore, the resistance of the first to sixth winding sub-portions 31 to 36 is lower toward the outside in the radial directions, and the generated heat increases toward the inside in the radial directions. The windings heated up more, which are disposed at the inner side, can be more cooled, whereby the temperature is evenly distributed in the radial directions of the stator winding 16, thereby cooling the stator winding 16 efficiently.

Fifth Embodiment

Figure 14:
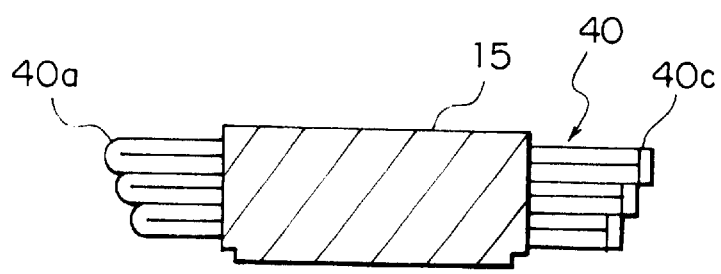
FIG. 14 is a sectional view of a critical portion of a stator used in an automotive alternator according to a fifth embodiment of the present invention.

According to a fifth embodiment, as shown in FIG. 14, the protrusion of turn portions 40a of strands of wire 40 and the protrusion of connected parts of open ends 40c of the strands of wire 40 respectively in the axial direction are reduced gradually toward the outside in the radial directions. The turn portions 40a and the connected parts of the open ends 40c are disposed respectively in three rows in the circumferential direction. The other configuration is the same as that which is described in the second embodiment.

In the fifth embodiment, since the protrusion of the turn portions 40a and the protrusion of the connected parts of the open ends 40a are reduced gradually toward the outside in the radial directions, the same effect can be obtained as that in the fourth embodiment.

Sixth Embodiment

Figure 15:
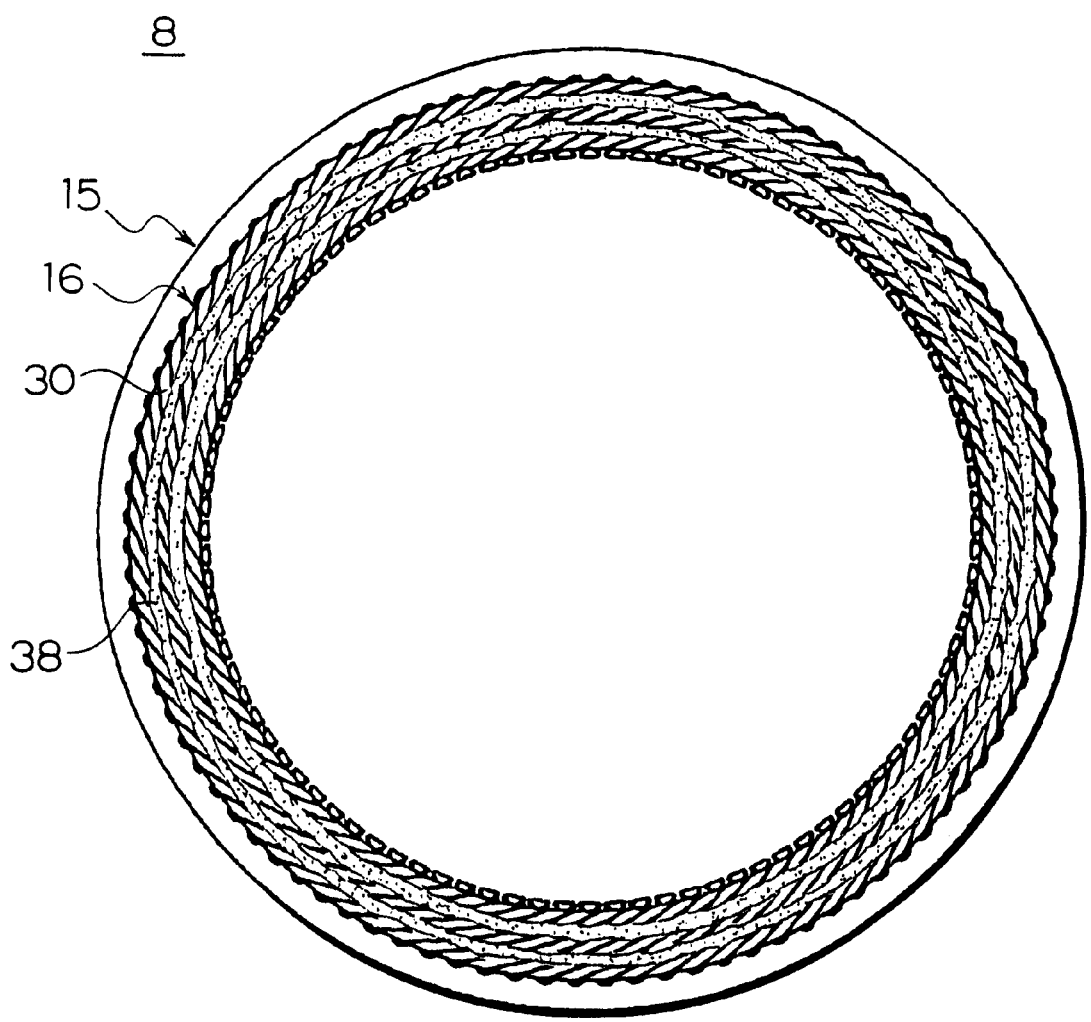
FIG. 15 is an end view of a stator used in an automotive alternator according to a sixth embodiment of the present invention.

According to a sixth embodiment, as shown in FIG. 15, an insulating resin 38 is disposed at the top of winding assemblies 39 disposed in three rows around the periphery of a stator core. The other configuration is the same as that which is described in the first embodiment.

According to the sixth embodiment, first series-connected windings 162a including first, third, and fifth winding sub-portions 31, 33, and 35 and second series-connected windings 162b including second, fourth, and sixth winding sub-portions 32, 34, and 36 are connected to each other via the insulating resin 38. The heat generated in the first and second series-connected windings 162a and 162b is transmitted to each other via the insulating resin 38, whereby the temperatures in the first and second series-connected windings 162a and 162b become substantially the same. Therefore, the temperature in coil-end groups 16f and 16r of a stator winding is evenly distributed.

The insulating resin 38 is disposed at the top of each of the coil-end groups 16f and 16r, thereby ensuring paths for cooling air flowing through the coil-end groups 16f and 16r and ensuring the cooling by the cooling air.

Seventh Embodiment

Figure 16:
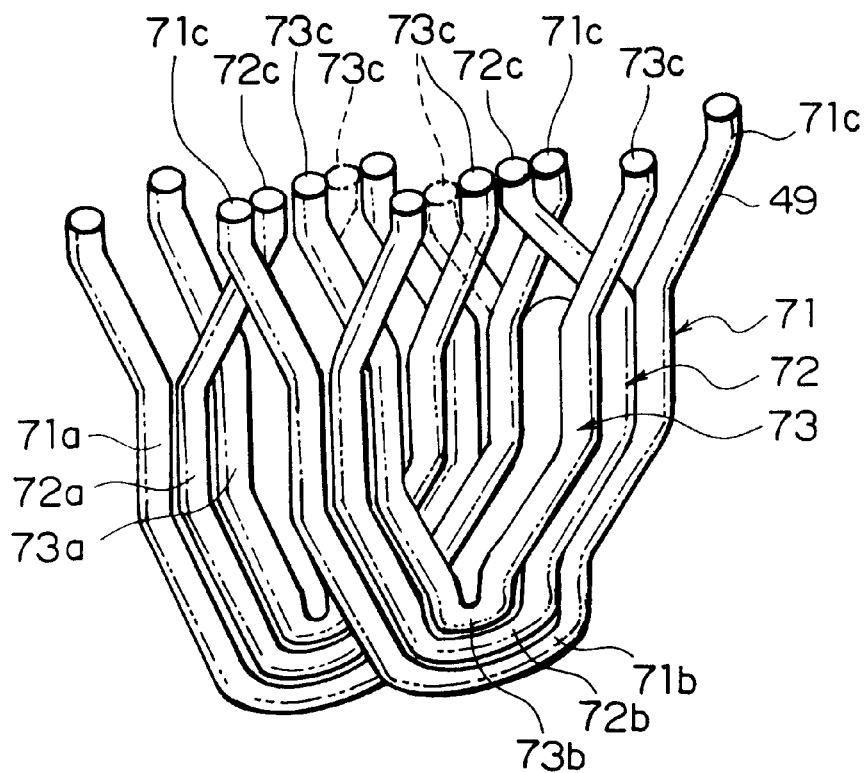
FIG. 16 is a perspective view of the disposition of strands of wire forming a stator winding used in an automotive alternator according to a seventh embodiment of the present invention.

According to a seventh embodiment, as shown in FIG. 16, conductor segments 71, 72, and 73 having substantially a U-shape coated with an insulating film 49 are used as strands of wire. Each of the conductor segments 71, 72, and 73 is inserted, at the ends thereof in a slot and in another slot of a stator core separated with five slots therebetween, from an axial end of the stator core, and the ends of the conductor segments 71, 72, and 73 extending from the other end of the same slots are connected to each other by welding or the like, thereby forming a coil of windings in four turns around the stator core.

At the other axial end of the stator core, an end 73c of the conductor segment 73 extending from the third address of a slot is connected to an end 73c of the other conductor segment 73 extending from the fourth address of another slot separated with five slots therebetween, thereby forming two wave windings 61 and 63, each in one turn per slot. An end 71c of the conductor segment 71 extending from the first address of a slot is connected to an end 72c of the conductor segment 72 extending from the second address of another slot separated with five slots therebetween, and the other end 72c of the conductor segment 72 extending from the fifth address of a slot is connected to the other end 71c of the conductor segment 71 extending from the sixth address of another slot separated with five slots therebetween, thereby forming two lap windings 62 and 64, each in two turns per slot.

Figure 17:
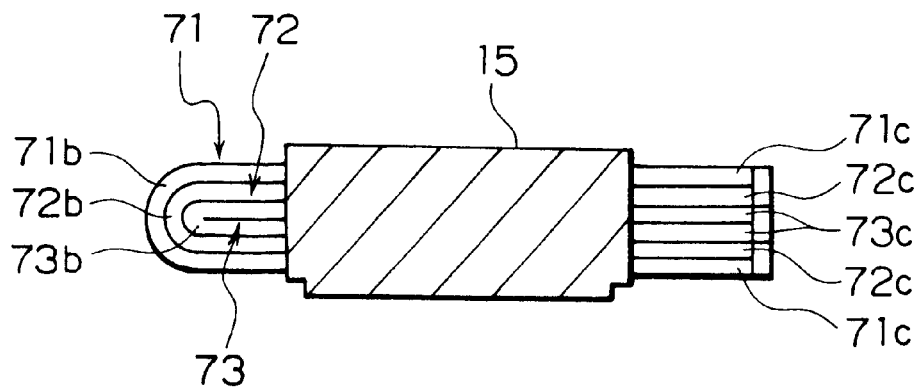
FIG. 17 is a sectional view of a critical portion of a stator used in the automotive alternator according to the seventh embodiment of the present invention.

Two sets of straight portions 71a, 72a, and 73a as in-slot-received portions of the conductor segments 71, 72, and 73, respectively, are disposed alongside each other in each slot. In FIG. 17, turn portions 72b of the conductor segments 72 cover turn portions 73b of the conductor segments 73, and turn portions 71b of the conductor segments 71 cover the turn portions 72b of the conductor segments 72, at an axial end of the stator core. The turn portions 71b, 72b, and 73b are stacked up in three layers in the axial direction and arranged neatly in the circumferential direction so as to form a coil-end group. At the other end of the stator core, connected parts between the ends 71c and 72c, the ends 73c and 73c, and the ends 72c and 71c, respectively, are disposed in a line in the radial direction, as shown in FIG. 17. The connected parts of the ends 71c, 72c, and 73c are arranged neatly in three rows in the circumferential direction. Thus, the other coil-end group is formed.

Figure 18:
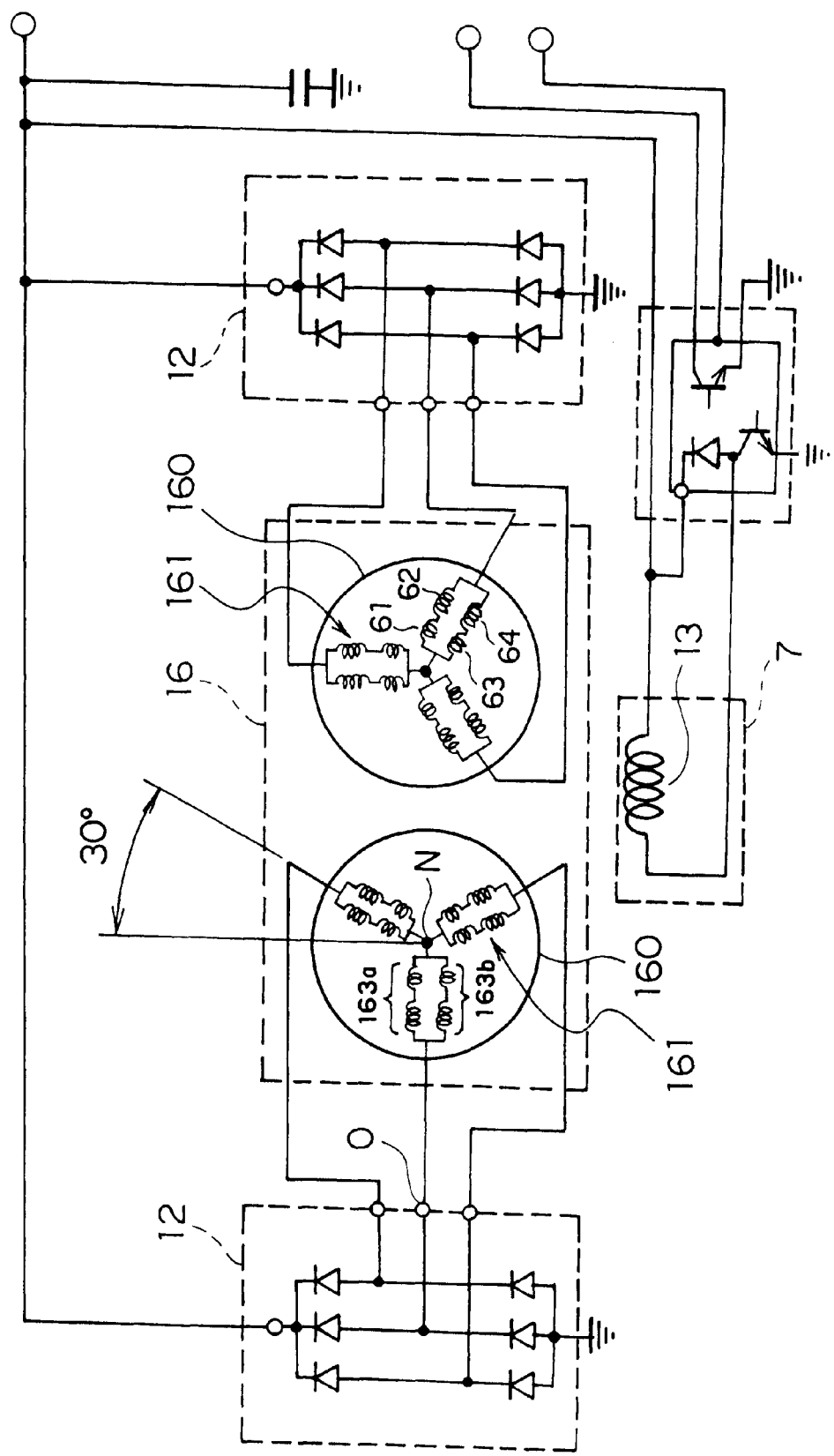
FIG. 18 is a block diagram of a circuit of the automotive alternator according to the seventh embodiment of the present invention.
Figure 19:
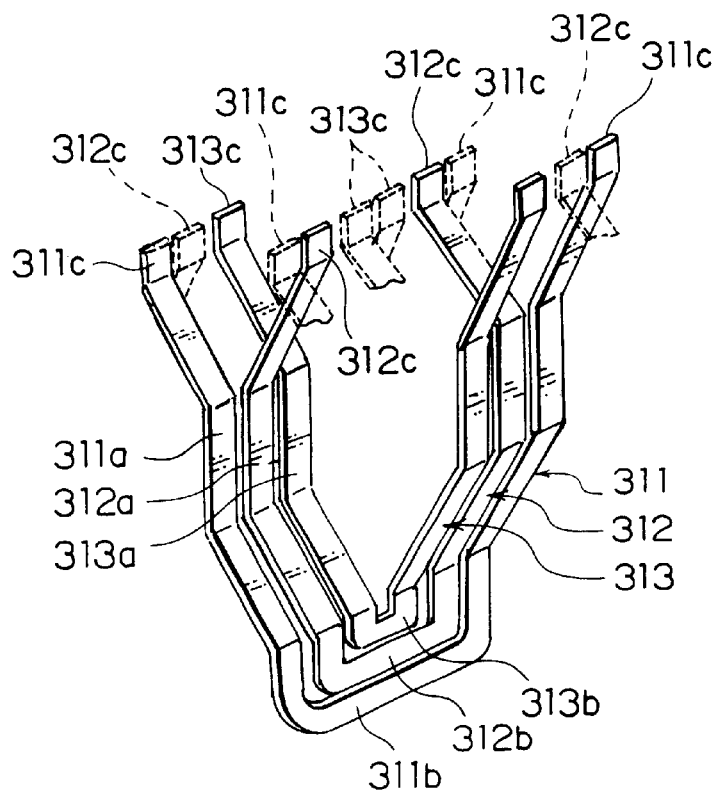
FIG. 19 is a perspective view showing the disposition of strands of wire forming a stator winding used in a known automotive alternator.
Figure 20:
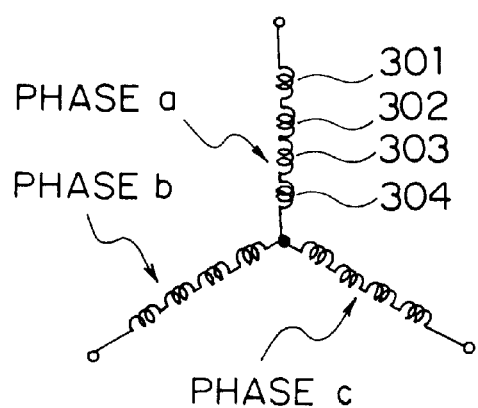
FIG. 20 is an illustration showing series connections of the stator winding used in the known automotive alternator.
Figure 21:
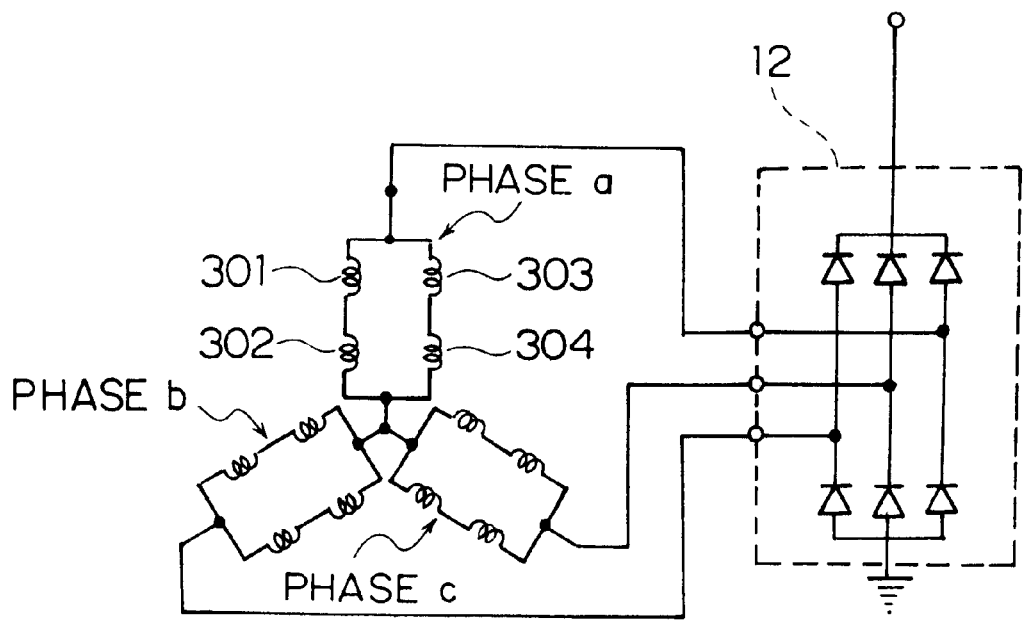
FIG. 21 is an illustration showing parallel connections of the stator windings used in the known automotive alternator.
Figure 22:
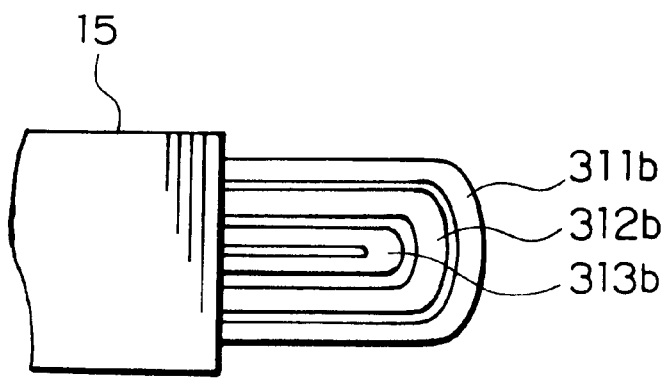
FIG. 22 is a sectional view of a critical portion of a stator used in the known automotive alternator.

As shown in FIG. 18, windings 163a in three turns are formed by connecting in series the wave windings 61 and the lap windings 62, and windings 163b in three turns are formed by connecting in series the wave windings 63 and the lap windings 64. The winding phase group 161 for each phase is formed by connecting in parallel the winding 163a in three turns and the winding 163b in three turns. Three sets of the winding phase group 161 for each phase are connected into an alternating connection, thereby forming a three-phase alternating winding 160. Two sets of the three-phase alternating winding 160 are connected individually to rectifiers 12. The direct current outputs of the rectifiers 12 are combined with each other by being connected in parallel.

According to the seventh embodiment, the conductor segments 71, 72, and 73 having a circular cross-section are used as strands of wire. Therefore, the conductor segments are formed easily compared with the strands of wire having a rectangular cross-section. With this arrangement, the turn portions 71b, 72b, and 73b (coil-end portion) can be easily formed, whereby the conductor segments 71, 72, and 73 can be easily manufactured. Moreover, the conductor segments 71, 72, and 73 are easily bent at the ends thereof, whereby the conductor segments 71, 72, and 73 can be easily bent so as to position the ends 71c, 72c, and 73c, when welding the ends 71c, 72c, and 73c with each other and with a metallic terminal 50, and the welding operation can be performed efficiently.

When using a strand of wire having a rectangular cross-section, there is a risk of damaging the insulating film 49 due to the edge of the strand of wire. However, according to the seventh embodiment, the damage to the insulating film 49 due to the interference between the strands of wire can be avoided because the cross-section of the strand of wire is circular, thereby improving the insulation reliability.

The turn portions 71b, 72b, and 73b forming the coil-end group are stacked up in three layers in the axial direction, and are disposed substantially evenly in the circumferential direction, whereby the wind resistance against cooling air at the coil-end groups is even in the circumferential direction, thereby cooling the coil-end group evenly in the circumferential direction and suppressing temperature rise in the stator winding.

According to the seventh embodiment, two sets of the straight portions 71a, 72a, and 73a, that is, six straight portions of the conductor segments 71, 72, and 73, respectively, are disposed alongside each other in each slot in the slot-depth direction. Two sets of windings 163a and 163b in three turns are formed in a manner such that each set is formed by connecting the ends 71c, 72c, and 73c of the conductor segments 71, 72, and 73 disposed in pairs of slots six slots apart occupying addresses differing in the slot-depth direction from each other. The winding phase group 161 for each phase is formed by connecting in parallel the windings 163a and 163b in three turns. Three sets of the winding phase group 161 are connected into an alternating connection (star connection), thereby forming a three-phase alternating winding 160. Two sets of the three-phase alternating winding 160 are connected individually to rectifiers 12. The alternating current outputs from the two sets of the three-phase alternating winding 160 are rectified individually by the rectifiers 12, and are outputted by being combined with each other.

The turn portions 71b, 72b, and 73b protruding from ninety-six slots (two slots per pole per phase) are stacked up in three layers in the axial direction and arranged neatly in the circumferential direction, thereby forming a coil-end group at an axial end of the stator core. At the other axial end of the stator core, the connected parts of the ends 71c, 72c, and 73c of the conductor segments 71, 72, and 73 protruding from the ninety-six slots are lined up in a row in the radial direction and arranged neatly in three rows in the circumferential direction, thereby forming the other coil-end group. The coil-end groups formed with 288 units of the bent portions 71b, 72b, and 73b and the connected parts of the ends 71c, 72c, and 73c are efficiently cooled, whereby temperature rise in the stator winding can be suppressed and a high output can be obtained. The temperature in the coil-end groups is distributed evenly compared with a known technology because two sets of electrical currents offset by 30 degrees from each other are generated, thereby suppressing temperature rise in the stator winding and providing an increased output. The loss per one rectifying diode is reduced by half compared with a known technology because two sets of rectifiers are used, whereby the temperature in the rectifying diodes is reduced and a high output is obtained.

By providing two sets of windings having a phase difference of 30 degrees from each other, harmonic magnetomotive force components, which cause magnetic noise of an alternator, can be cancelled. The strength of the coil-end groups is increased by disposing the turn portions 71b, 72b, and 73b in three layers, thereby further reducing the magnetic noise.

Although according to the seventh embodiment, the windings for each phase of the stator winding are formed by connecting in parallel windings connected the lap winding and the wave winding in series, the configuration of windings is not limited to that which is described in the embodiment.

Although according to the embodiments described above, the strand of wire is made of copper, the strand of wire is not limited to a copper wire, and it may be made of aluminum.

Although according to the embodiments described above, the windings are used in the stator winding for an automotive alternator, the dynamo-electric machine according to the present invention may be an alternator for other uses or an electric motor.

Although a stator as an armature is used in the above embodiments, it may be a rotor serving as an armature.

With the above-described arrangement, the following advantages are offered.

According to the present invention, a dynamo-electric machine comprises:

an armature including an armature core provided with a plurality of slots extending in an axial direction of the armature core and disposed alongside each other in a circumferential direction of the armature core, and an armature winding mounted in the slots provided on the armature core, wherein the armature winding comprises first wave-shaped windings and second wave-shaped windings, the first wave-shaped windings comprising a number of first winding sub-portions each having one turn constructed by winding in a wave-shape a strand of wire so as to alternating occupy an inner layer and an outer layer in a slot-depth direction within the slots at intervals of a predetermined number of slots, the first winding sub-portions being disposed at a pitch of one slot from each other and being equal in number to the predetermined number of slots, and the second wave-shaped windings comprising a number of second winding sub-portions each having one turn constructed by winding in a wave-shape a strand of wire so as to alternating occupy an inner layer and an outer layer in a slot-depth direction within the slots at intervals of the predetermined number of slots and so as to be inversely wound and offset by an electrical angle of 180 degree relative to the first winding sub-portions, the second winding sub-portions being disposed at a pitch of one slot from each other and being equal in number to the predetermined number of slots, whereby n-pairs (n represents a natural number) of the first wave-shaped windings and the second wave-shaped windings are disposed so as to arrange alternately and in a row in-slot-received portions of the first winding sub-portions and in-slot-received portions of the second winding sub-portions in the slot-depth direction within each of the slots; and wherein the armature winding includes winding phase groups for each phase, each of the winding phase groups comprising 2n windings composed of the first and second winding sub-portions disposed in a group of slots at intervals of the predetermined number of the slots, two sets of the n windings being connected in series to form two series-connected windings each having n-turns, whereby the winding phase group is constructed by connecting the two series-connected windings in parallel. With this arrangement, the protrusion of coil-end portions of the armature core is reduced, the resistance of the windings decreases, and the exposure area of the coil-end groups increases, whereby a high-output dynamo-electric machine reduced in size can be obtained. Parallel-connected windings can be obtained without significantly increasing the flatness ratio of the strands of wire.

The two series-connected windings may comprise first series-connected winding having n-turns formed by connecting in series the first winding sub-portions disposed in the group of slots and second series-connected winding having n-turns formed by connecting in series the second winding sub-portions disposed in the same group of slots as the group of the slots in which the first winding sub-portions are disposed. With this arrangement, the first and second series-connected windings can be cooled in a well-balanced manner, thereby improving efficiency in cooling of the armature winding.

In the dynamo-electric machine according to the present invention, an expression n=2m+1 (m represents a natural number) may be satisfied. With this arrangement, the output in a high-rotation range is improved by reducing the armature reaction while maintaining the output in a low-rotation range.

The strand of wire may be a substantially U-shaped conductor segment, and each of the first winding sub-portion and the second winding sub-portion may include a plurality of the conductor segments forming a wave winding in one turn connected to each other at the open ends thereof With this arrangement, the protrusion of the coil-end groups is reduced, the exposure area of the coil ends increases, and the high output and the reduction in size are possible. Since conductor segments differing in size are not necessary, the productivity can be improved.

The strand of wire may be a continuous conductive wire, and each of the first winding sub-portion and the second winding sub-portion may include a single continuous conductive wire forming a wave winding in one turn. With this arrangement, connecting points are significantly reduced, thereby improving productivity and yield ratio. The protrusion of the coil-end groups is reduced. The exposure area of the coil ends increases. The high output and the reduction in size are possible.

Each pair of the first wave-shaped windings and the second wave-shaped windings may be formed with individual wire assemblies including a plurality of the first winding sub-portions and a plurality of the second winding sub-portions. With this arrangement, damages to insulating films are suppressed during mounting of the windings on the armature core, thereby improving insulation reliability and facilitating the increase of turns.

The strand of wire may be a conductor having a substantially circular cross-section. With this arrangement, the strand of wire can be easily formed, and damages to the insulating films due to the interference between each strand of wire can be suppressed.

The two series-connected windings for each phase forming the armature winding may be connected to each other via a metallic terminal, thereby facilitating connection operation.

The armature core may be a cylindrical stator core made of a laminated iron core, further the dynamo-electric machine may comprise a rotor forming N and S poles along the rotational periphery thereof, the rotor being disposed at an inside of and coaxially with the stator core, and a fan unit fixed to the rotor at the axial ends thereof for applying cooling air to coil-end groups of the armature winding by the rotation of the fan unit, thereby improving the efficiency in cooling of the stator winding.

The n-pairs of the first wave-shaped windings and the second wave-shaped windings may include protrusions thereof from the axial ends of the stator core decreasing gradually toward the outside in the radial directions of the stator core, whereby the temperature in the stator winding is distributed evenly in the radial directions.

According to the present invention another dynamo-electric machine is provided which comprises:

an armature including an armature core provided with a plurality of slots extending in an axial direction of the armature core and disposed alongside each other in a circumferential direction of the armature core, and armature winding mounted in the slots provided on the armature core, wherein two slots per pole per phase are formed in the armature core;

wherein the armature winding comprises two alternating windings, each formed by connecting winding phase groups for each phase into a alternating connection;

wherein each of the winding phase groups for each phases is formed by connecting in parallel two windings each having n-turns (n represents a natural number), the windings being constructed by winding a strand of wire in the armature core so as to dispose 2n in-slot-received portions of the strand of wire within each of the slots alongside each other in the slot-depth direction and so as to connect each in-slot-received portion in a first slots to other in-slot-received portions occupying addresses, in the slots individually separated from the first slot by a predetermined number of slots, differing in the slot-depth direction from that which is occupied by the in-slot-received portion in the first slot, at the outside of the slots; and wherein the individual alternating current outputs from the two alternating windings are rectified by first and second rectifiers, respectively, and outputted by being combined with each other. With this arrangement, a high-output dynamo-electric machine can be realized.

N-rows of coil ends, each coil end being formed by connecting the in-slot-received portion in the first slots to the other in-slot-received portion occupying addresses, in the slots individually separated from the first slot by the predetermined number of slots, differing in the slot-depth direction from that which is occupied by the in-slot-received portion in the first slot, may be formed at at least one of the axial ends of the armature core, and the protrusion, in the axial direction, of the n-rows of the coil ends may be decreases gradually toward the outside in the radial direction of the armature core, whereby the temperature in the armature windings is distributed evenly in the radial directions.

N-rows of coil ends, each coil end being formed by connecting the in-slot-received portion in the first slots to the other in-slot-received portion occupying addresses, in the slots individually separated from the first slot by the predetermined number of slots, differing in the slot-depth direction from that which is occupied by the in-slot-received portion in the first slot, may be formed at at least one of the axial ends of the armature core, and the coil ends in the n-rows may be arranged substantially evenly in the circumferential direction of the armature core. With this arrangement, the wind resistance against cooling air to the coil-end groups becomes even in the radial directions, thereby cooling the coil-end groups evenly in the radial directions and suppressing temperature rise in the armature winding.

Coil ends, each being formed by connecting the in-slot-received portion in the first slots to the other in-slot-received portion occupying addresses, in the slots individually separated from the first slot by the predetermined number of slots, differing in the slot-depth direction from that which is occupied by the in-slot-received portion in the first slot, may be stacked up in n-layers in the axial direction of the armature core at at least one of the axial ends of the armature core, and the coil ends in the n-layers may be arranged substantially evenly in the circumferential direction of the armature core. With this arrangement, the wind resistance against cooling air to the coil-end groups becomes even in the radial directions, thereby cooling the coil-end groups evenly in the radial directions and suppressing temperature rise in the armature windings.

Each strand of wire may be formed with substantially U-shaped conductor segments, whereby the resistance of the windings is reduced, and the coil-end groups can be disposed in order and be highly concentrated.

Each strand of wire may be formed with a continuous conductive wire, whereby connecting points can be significantly reduced, and the productivity and yield ratio are improved.

An insulating resin may be disposed at at least one of the axial ends of the armature core and between the two windings each having n-turns forming the winding phase groups for each phase. With this arrangement, the difference in temperature between the pair of the windings in n-turns is reduced, and the temperature is distributed evenly in the armature winding.

The foregoing description of the preferred embodiments of the invention has been presented for purposes of illustration and description. It is not intended to be exhaustive or to limit the invention to the precise from disclosed, and modifications and variations are possible in light of the above teachings or may be acquired from practice of the invention. The embodiments ware chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and thier equivalents.

What is claimed is:

1. A dynamo-electric machine comprising:

an armature including an armature core provided with a plurality of slots extending in an axial direction of the armature core and disposed alongside each other in a circumferential direction of the armature core, and an armature winding mounted in the slots provided on the armature core, wherein the armature winding comprises first wave-shaped windings and second wave-shaped windings, the first wave-shaped windings comprising a number of first winding sub-portions each having one turn constructed by winding in a wave-shape a strand of wire so as to alternating occupy an inner layer and an outer layer in a slot-depth direction within the slots at intervals of a predetermined number of slots, the first winding sub-portions being disposed at a pitch of one slot from each other and being equal in number to the predetermined number of slots, and the second wave-shaped windings comprising a number of second winding sub-portions each having one turn constructed by winding in a wave-shape a strand of wire so as to alternating occupy an inner layer and an outer layer in a slot-depth direction within the slots at intervals of the predetermined number of slots and so as to be inversely wound and offset by an electrical angle of 180 degree relative to the first winding sub-portions, the second winding sub-portions being disposed at a pitch of one slot from each other and being equal in number to the predetermined number of slots, whereby n-pairs of the first wave-shaped windings and the second wave-shaped windings are disposed so as to arrange alternately and in a row in-slot-received portions of the first winding sub-portions and in-slot-received portions of the second winding sub-portions in the slot-depth direction within each of the slots; and wherein the armature winding includes winding phase groups for each phase, each of the winding phase groups comprising 2n windings composed of the first and second winding sub-portions disposed in a group of slots at intervals of the predetermined number of the slots, two sets of the n windings being connected in series to form two series-connected windings each having n-turns, whereby the winding phase group is constructed by connecting the two series-connected windings in parallel, where n=2m+1, and n and m are natural numbers.

2. The dynamo-electric machine according to claim 1, wherein the two series-connected windings comprise first series-connected winding having n-turns formed by connecting in series the first winding sub-portions disposed in the group of slots and second series-connected winding having n-turns formed by connecting in series the second winding sub-portions disposed in the same group of slots as the group of the slots in which the first winding sub-portions are disposed.

3. The dynamo-electric machine according to claim 1, wherein the strand of wire is a substantially U-shaped conductor segment, and each of the first winding sub-portion and the second winding sub-portion includes a plurality of the conductor segments forming a wave winding in one turn connected to each other at the open ends thereof.

4. The dynamo-electric machine according to claim 1, wherein the strand of wire is a continuous conductive wire, and each of the first winding sub-portion and the second winding sub-portion includes a single continuous conductive wire forming a wave winding in one turn.

5. The dynamo-electric machine according to claim 4, wherein each pair of the first wave-shaped windings and the second wave-shaped windings is formed with individual wire assemblies including a plurality of the first winding sub-portions and a plurality of the second winding sub-portions.

6. The dynamo-electric machine according to claim 1, wherein the strand of wire is a conductor having a substantially circular cross-section.

7. The dynamo-electric machine according to claim 1, wherein the two series-connected windings for each phase forming the armature winding are connected to each other via a metallic terminal.

8. The dynamo-electric machine according to claim 1, wherein the armature core is a cylindrical stator core made of a laminated iron core, further comprising a rotor forming N and S poles along the rotational periphery thereof, the rotor being disposed at an inside of and coaxially with the stator core, and a fan unit fixed to the rotor at the axial ends thereof for applying cooling air to coil-end groups of the armature winding by the rotation of the fan unit.

9. The dynamo-electric machine according to claim 8, wherein the n-pairs of the first wave-shaped windings and the second wave-shaped windings include protrusions thereof from the axial ends of the stator core decreasing gradually toward the outside in the radial directions of the stator core.

10. A dynamo-electric machine comprising:

an armature including an armature core provided with a plurality of slots extending in an axial direction of the armature core and disposed alongside each other in a circumferential direction of the armature core, and armature winding mounted in the slots provided on the armature core, wherein two slots per pole per phase are formed in the armature core;

wherein the armature winding comprises two alternating windings, each formed by connecting winding phase groups for each phase into an alternating connection;

wherein each of the winding phase groups for each phases is formed by connecting in parallel two windings each having n-turns, where n is a natural number, the windings being constructed by winding a strand of wire in the armature core so as to dispose 2n in-slot-received portions of the strand of wire within each of the slots alongside each other in the slot-depth direction and so as to connect each in-slot-received portion in a first slot to other in-slot-received portions occupying addresses, in the slots individually separated from the first slot by a predetermined number of slots, differing in the slot-depth direction from that which is occupied by the in-slot-received portion in the first slot, at the outside of the slots;

wherein n-rows of coil ends, each coil end being formed by connecting the in-slot-received portion in the first slots to the other in-slot-received portion occupying addresses, in the slots individually separated from the first slot by the predetermined number of slots, differing in the slot-depth direction from that which is occupied by the in-slot-received portion in the first slot, are formed on at least one of the axial ends of the armature core, and the protrusion, in the axial direction, of the n-rows of the coil ends decreases gradually toward the outside in the radial direction of the armature core; and wherein the individual alternating current outputs from the two alternating windings are rectified by first and second rectifiers, respectively, and outputted by being combined with each other.

11. The dynamo-electric machine according to claim 10, wherein the coil ends in the n-rows are arranged substantially evenly in the circumferential direction of the armature core.

12. The dynamo-electric machine according to claim 10, wherein coil ends, each being formed by connecting the in-slot-received portion in the first slot to the other in-slot-received portion occupying addresses, in the slots individually separated from the first slot by the predetermined number of slots, differing in the slot-depth direction from that which is occupied by the in-slot-received portion in the first slot, are stacked up in n-layers in the axial direction of the armature core on the other axial end of the armature core, and the coil ends in the n-layers are arranged substantially evenly in the circumferential direction of the armature core.

13. The dynamo-electric machine according to claim 10, wherein each strand of wire is formed with substantially U-shaped conductor segments.

14. The dynamo-electric machine according to claim 10, wherein each strand of wire is formed with a continuous conductive wire.

15. The dynamo-electric machine according to claim 10, wherein an insulating resin is disposed on at least one of the axial ends of the armature core and between the two windings each having n-turns forming the winding phase groups for each phase.

16. A dynamo-electric machine comprising:

an armature including an armature core provided with a plurality of slots extending in an axial direction of the armature core and disposed alongside each other in a circumferential direction of the armature core, and armature winding mounted in the slots provided on the armature core, wherein two slots per pole per phase are formed in the armature core;

wherein the armature winding comprises two alternating windings, each formed by connecting winding phase groups for each phase into a alternating connection;

wherein each of the winding phase groups for each phases is formed by connecting in parallel two windings each having n-turns and including a lap winding and a wave winding connected in series, where n is a natural number, the windings being constructed by winding a strand of wire in the armature core so as to dispose 2n in-slot-received portions of the strand of wire within each of the slots alongside each other in the slot-depth direction and so as to connect each in-slot-received portion in a first slots to other in-slot-received portions occupying addresses, in the slots individually separated from the first slot by a predetermined number of slots, differing in the slot-depth direction from that which is occupied by the in-slot-received portion in the first slot, at the outside of the slots; and wherein the individual alternating current outputs from the two alternating windings are rectified by first and second rectifiers, respectively, and outputted by being combined with each other.

* * * * *